United States Patent
Kawasumi

(10) Patent No.: US 11,532,362 B2
(45) Date of Patent: Dec. 20, 2022

(54) SEMICONDUCTOR MEMORY DEVICE AND METHOD FOR DRIVING THE SAME

(71) Applicant: Kioxia Corporation, Tokyo (JP)

(72) Inventor: Atsushi Kawasumi, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 40 days.

(21) Appl. No.: 17/338,987

(22) Filed: Jun. 4, 2021

(65) Prior Publication Data
US 2022/0084601 A1 Mar. 17, 2022

(30) Foreign Application Priority Data

Sep. 16, 2020 (JP) .............................. JP2020-155849

(51) Int. Cl.
| | |
|---|---|
| G11C 16/08 | (2006.01) |
| G11C 16/12 | (2006.01) |
| G11C 16/26 | (2006.01) |
| G11C 16/30 | (2006.01) |
| G11C 7/10 | (2006.01) |
| H03K 5/14 | (2014.01) |
| H03K 19/21 | (2006.01) |

(52) U.S. Cl.
CPC ............ *G11C 16/12* (2013.01); *G11C 7/1057* (2013.01); *G11C 16/08* (2013.01); *G11C 16/26* (2013.01); *G11C 16/30* (2013.01); *H03K 5/14* (2013.01); *H03K 19/21* (2013.01)

(58) Field of Classification Search
CPC ....... C11C 16/12; C11C 7/1057; C11C 16/08; C11C 16/26; C11C 16/30; H03K 5/14; H03K 19/21

USPC .......................................................... 365/226
See application file for complete search history.

(56) References Cited

U.S. PATENT DOCUMENTS

| | | | | |
|---|---|---|---|---|
| 6,426,656 B1 * | 7/2002 | Dally | ................... | G11C 7/1084 327/51 |
| 6,903,951 B1 * | 6/2005 | James | .................... | G11C 15/00 365/49.17 |
| 6,965,299 B1 * | 11/2005 | Dally | ................... | G06F 13/4009 340/14.1 |
| 7,319,730 B2 | 1/2008 | Okuda | | |

(Continued)

FOREIGN PATENT DOCUMENTS

| | | |
|---|---|---|
| JP | 2003-143242 A | 5/2003 |
| JP | 6227792 B2 | 11/2017 |

*Primary Examiner* — Ly D Pham
(74) *Attorney, Agent, or Firm* — Foley & Lardner LLP

(57) ABSTRACT

A semiconductor memory device according to an embodiment includes a peripheral circuit part supplied with a first voltage, a core circuit part supplied with a second voltage greater than the first voltage, a pre-decoder provided in the peripheral circuit part, input with a signal and outputting a one-hot signal corresponding to the signal, a first wiring provided in the peripheral circuit part, electrically connected to the pre-decoder, and supplied with the one-hot signal, a second wiring provided in the core circuit part, a level shifter provided in the peripheral circuit part, supplied with a first voltage and a second voltage, and transferring the one-hot signal from the first wiring in the peripheral circuit part to the second wiring in the core circuit part, and a memory cell array provided in the core circuit part and operating based on the transferred one-hot signal.

19 Claims, 15 Drawing Sheets

(56) References Cited

U.S. PATENT DOCUMENTS

| | | | |
|---|---|---|---|
| 9,245,625 B2 | 1/2016 | Joshi | |
| 10,437,769 B2 | 10/2019 | Greenspan | |
| 2006/0145193 A1* | 7/2006 | So | G11C 8/10 |
| | | | 365/201 |
| 2009/0168523 A1* | 7/2009 | Shirakawa | G11C 16/20 |
| | | | 365/185.11 |
| 2009/0190405 A1* | 7/2009 | Tokiwa | G11C 29/12 |
| | | | 365/230.06 |

* cited by examiner

Transferring n-bit random data, the average of the data transition is n / 2 times per one data transfer.

Converting n-bit random data into a one-hot signal and transferring the one-hot signal, the data transition occurs twice per one data transfer.

Converting n-bit random data to a one-hot signal and setting only 1 bit to the logical value "1", the data transition is performed once per one data transfer.

SEMICONDUCTOR MEMORY DEVICE AND METHOD FOR DRIVING THE SAME

CROSS-REFERENCE TO RELATED APPLICATION(S)

This application is based upon and claims the benefit of priority from the prior Japanese Patent Application No. 2020-155849, filed on Sep. 16, 2020, the entire contents of which are incorporated herein by reference.

FIELD

Embodiment described herein relate generally to a semiconductor memory device and a method for driving the same.

BACKGROUND

A semiconductor memory device includes, for example, a memory cell array and a pre-decoder that transfers signals for driving the memory cell array.

DETAILED DESCRIPTION

Figure 1:
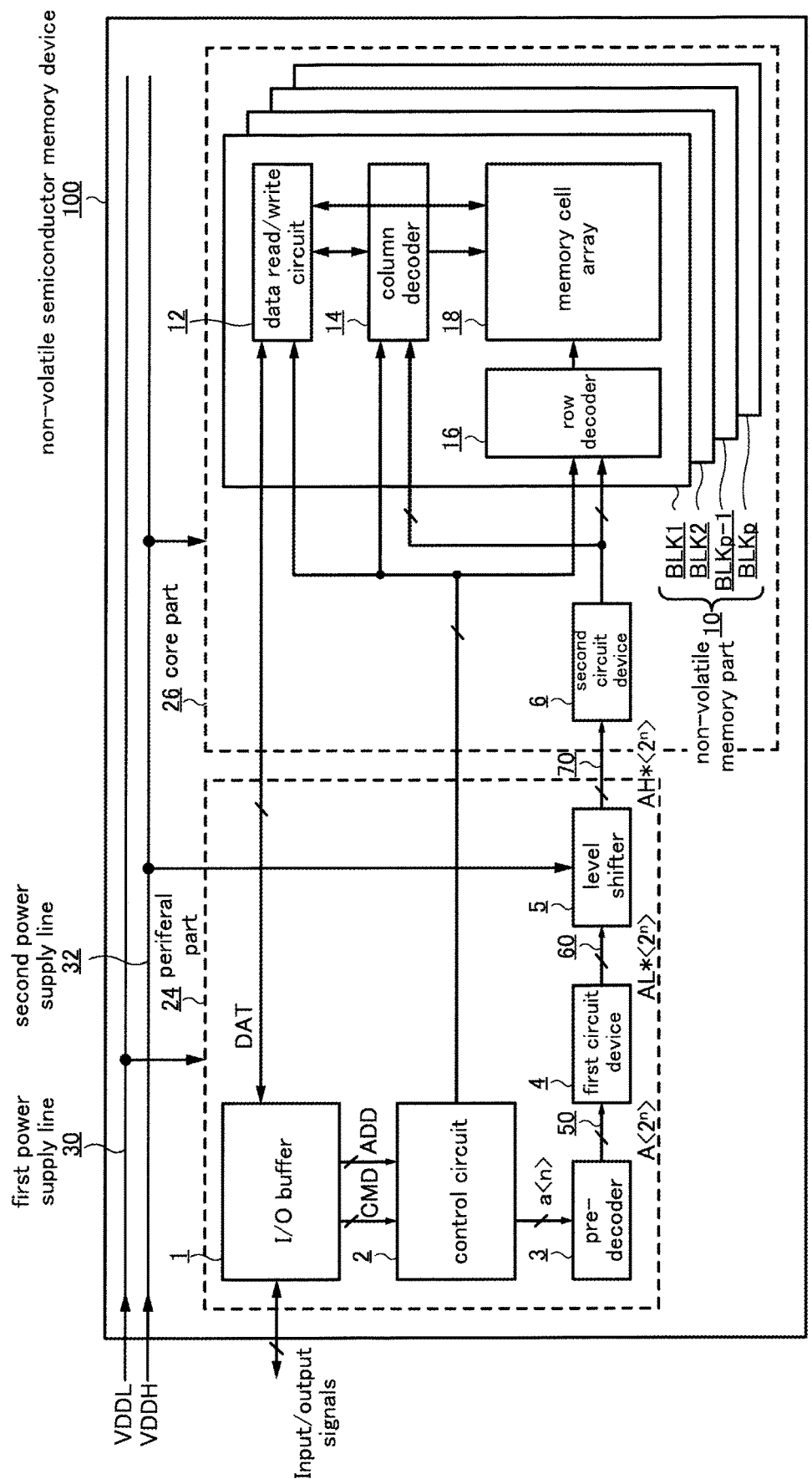
FIG. 1 is a block diagram showing a configuration of a semiconductor memory device according to the first embodiment.

A semiconductor memory device includes a peripheral circuit part supplied with a first voltage, a core circuit part supplied with a second voltage greater than the first voltage, a pre-decoder provided in the peripheral circuit part, input with a signal and outputting a one-hot signal corresponding to the signal, a first wiring provided in the peripheral circuit part, electrically connected to the pre-decoder and supplied with the one-hot signal, a second wiring provided in the core circuit part, a level shifter supplied with the first voltage and the second voltage and transferring the one-hot signal from the first wiring in the peripheral circuit part to the second wiring in the core circuit part, and a memory cell array provided in the core circuit part and operating based on the transferred one-hot signal.

A method for driving a semiconductor memory device including a peripheral circuit part supplied with a first voltage, a core circuit part supplied with a second voltage greater than the first voltage, a pre-decoder provided in the peripheral circuit part, a first wiring provided in the peripheral circuit part and electrically connected to the pre-decoder, a second wiring provided in the core circuit part, a level shifter supplied with the first voltage and the second voltage, and a memory cell array provided in the core circuit part includes: inputting a signal to the pre-decoder and outputting a one-hot signal corresponding to the signal from the pre-decoder; supplying the one-hot signal to the level shifter and transferring the one-hot signal from the first wiring in the peripheral circuit part to the second wiring in the core circuit part; supplying the memory cell array with a signal based on the transferred one-hot signal, and operating the memory cell array.

A semiconductor memory device includes a peripheral circuit part supplied with a first voltage, a core circuit part supplied with a second voltage greater than the first voltage, a pre-decoder provided in the peripheral circuit part, input with a first signal part and the first signal part of a signal including a second signal part, and outputting a one-hot signal corresponding to the first signal part, a first wiring provided in the peripheral circuit part, electrically connected to the pre-decoder, and supplied with the one-hot signal, a second wiring provided in the core circuit part, a first level shifter supplied with the first voltage and the second voltage and transferring the one-hot signal from the first wiring in the peripheral circuit part to the second wiring in the core circuit part, a second level shifter supplied with the first voltage and the second voltage, shifting a level of a voltage of the second signal part from a level of the first voltage to a level of the second voltage, and generating a level shift signal of the second signal part, a first memory cell array provided in the core circuit part and operating based on the transferred one-hot signal, and a second memory cell array provided in the core circuit part and operating based on the level shift signal of the second signal part.

Embodiments will be described below with reference to the drawings. In the following description, components having the same function and configuration are denoted by common reference numerals. When a plurality of components having common reference numerals are distinguished, the common reference numerals are given subscripts to distinguish them. In the case where no particular distinction is required between a plurality of components, the plurality of components are given only common reference numerals and are not given subscripts. Each of the embodiments described below exemplifies a device and a method for embodying a technical idea of an embodiment. The technical idea of an embodiment is not specified in the structure, arrangement, etc. of the component parts as follows. Various modifications may be made to the technical idea of an embodiment in addition to the scope of the claims.

1. First Embodiment

<1-1. Overall Configuration of Semiconductor Memory Device 100>

Figure 2:
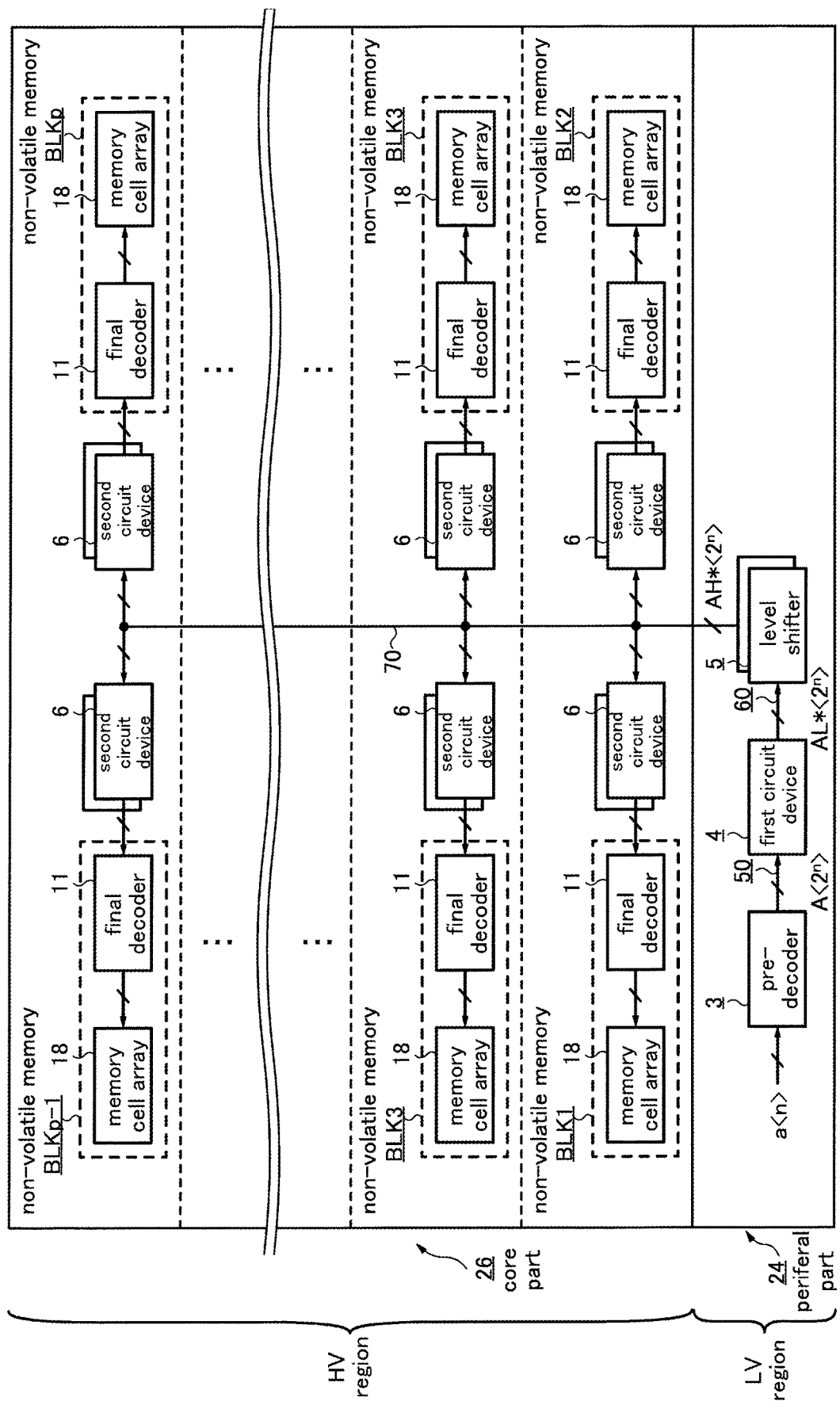
FIG. 2 is a block diagram showing a configuration of a semiconductor memory device according to the first embodiment.

FIGS. 1 and 2 are examples of block diagrams showing the basic overall configuration of a semiconductor memory device 100. The configuration of the semiconductor memory device 100 according to the present embodiment is not limited to the configuration shown in FIGS. 1 and 2.

As shown in FIG. 1, the semiconductor memory device 100 includes a peripheral part 24, a core part 26, a first power supply line 30, and a second power supply line 32. The peripheral part 24 includes an I/O buffer 1, a control circuit 2, a pre-decoder 3, a first circuit device 4, a level shifter 5. The core part 26 includes a second circuit device 6 and a non-volatile memory part 10. The non-volatile memory part 10 includes a data read/write circuit 12, a column decoder 14, a row decoder 16, and a memory cell array 18. The non-volatile memory part 10 includes, for example, a plurality of non-volatile memories BLK (BLK1 to BLKp, p is a positive natural number). In FIG. 1, although a part of a transfer of signals between each block is indicated by arrow lines, the transfer of signals between each block is not limited to the example shown in FIG. 1.

A first power supply voltage VDDL is supplied to the first power supply line 30. The first power supply line 30 supplies the first power supply voltage VDDL to the peripheral part 24. A second power supply voltage VDDH is supplied to the second power supply line 32. The second power supply line 32 supplies the second power supply voltage VDDH to the level shifter 5 and the core part 26. The second power supply voltage VDDH is greater than the first power supply voltage VDDL. The first power supply voltage VDDL and the second power supply voltage VDDH are, for example, supplied to the semiconductor memory device 100 from an external power supply circuit.

The I/O buffer 1 controls an input (reception) of each signal from an external controller (not shown) and an output (transmission) of each signal to the external controller. Each signal includes, for example, a data DAT, an address ADD, and a command CMD. More specifically, the I/O buffer 1 transmits the data DAT received from the external controller to the data write/read circuit 12 and transmits the address ADD and the command CMD received from the external controller to the control circuit. An operating voltage of the external controller is equivalent to the operating voltage of the peripheral part 24 or not more than the operating voltage of the peripheral part 24. In the present embodiment, each of the input, reception, output, and transmission of each signal, or the input, reception, output, and transmission of each signal may be collectively referred to as a transfer of each signal.

The control circuit 2 controls the pre-decoder 3 and the non-volatile memory part 10 in accordance with the received address ADD and the command CMD. For example, the control circuit 2 may include a register that temporarily stores the address ADD and the command CMD. The control circuit 2 decodes the command CMD indicating an operation mode and transfers a signal based on the decoded command to the data read/write circuit 12, the column decoder 14, and the row decoder 16. In response to the decoded command, the control circuit 2 transfers an n-bit (n is a positive natural number) address signal a<n> included in the address ADD to the pre-decoder 3. The signal based on the decoded command is, for example, a signal that instructs to write data to the non-volatile memory part 10, a signal that instructs to read data from the non-volatile memory part 10. In the present embodiment, the control circuit 2 is sometimes referred to as a controller.

The pre-decoder 3 receives the address signal a<n> from the control circuit 2, generates a pre-decoded signal (pre-decode signal) A<$2^n$> according to the address signal a<n>, and outputs the pre-decode signal A<$2^n$> to the first circuit device 4. In this embodiment, the pre-decode signal is sometimes referred to as a one-hot signal. The pre-decoder 3 is electrically connected to a wiring 50 and supplies the pre-decode signal A<$2^n$> to the wiring 50. The wiring 50 is a bus line supplied with the pre-decode signal A<$2^n$>. In this embodiment, the wiring 50 is sometimes referred to as a first wiring.

As will be described in detail later, the pre-decode signal A<$2^n$> is the one-hot signal. The one-hot signal is a signal in which only one signal of the pre-decode signal A<$2^n$> becomes a logical value "1". That is, it is a signal in which only one signal of the pre-decode signal A<$2^n$> changes. For example, when the address changes by one bit, a rising or falling of one certain signal change. Therefore, in the transfer of the decode signal according to the present embodiment, as compared with a configuration that the rising and falling of the signal changes every time the address changes by 1 bit and the signal line is charged and discharged, the energy required for charging and discharging the signal line can be reduced and energy consumed by the transfer of the signal can be suppressed.

As will be described in detail later, the first circuit device 4 receives the pre-decode signal A<$2^n$> from the pre-decoder 3, generates a one-hot signal AL<$2^n$>, and outputs the one-hot signal AL<$2^n$> to the level shifter 5. The first circuit device 4 is electrically connected to the pre-decoder 3, the level shifter 5, the wiring 50, and a wiring 60, and supplies the one-hot signal AL<$2^n$> to the wiring 60. The wiring 60 is a bus line supplied with the one-hot signal AL<$2^n$>.

As will be described in detail later, the level shifter 5 receives the one-hot signal AL<$2^n$> from the first circuit device 4, generates a one-hot signal AH<$2^n$>, and outputs the one-hot signal AH<$2^n$> to the second circuit device 6. The level shifter 5 is electrically connected to the first circuit device 4, the second circuit device 6, the wiring 60, and a wiring 70, and supplies the one-hot signal AH<$2^n$> to the wiring 70. The wiring 70 is a bus line supplied with the one-hot signal AH<$2^n$>. In this embodiment, the wiring 70 is sometimes referred to as a second wiring.

As will be described in detail later, the second circuit device 6 receives the one-hot signal AH<$2^n$>, generates a decode signal, and outputs the decode signal. The second circuit device 6 is electrically connected to the level shifter 5, the column decoder 14, the row decoder 16, and the wiring 70. The wiring that electrically connects the second circuit device 6 to the column decoder 14 and the row decoder 16 is a bus line supplied with the decode signal.

The memory cell array 18 includes a plurality of non-volatile memory elements (not shown) arranged in a matrix in a row direction and a column direction intersecting the row direction. In the non-volatile memory part 10 according to the present embodiment, at least one non-volatile memory element among the plurality of non-volatile memory elements is selected in accordance with a signal based on commands input to the data read/write circuit 12, the column decoder 14, and the row decoder 16, and a decode signal input to the column decoder 14 and the row decoder 16. Data is written to the selected non-volatile memory element. Data is read from the selected non-volatile memory element. The semiconductor memory device 100 according to the present embodiment is, for example, a phase change type memory (Phase Change RAM), or a non-volatile memory such as a PCM (Phase Change Memory), a resistance change type memory (ReRAM (Resistive Random Access Memory)). The non-volatile memory element is, for example, a phase change type memory element or a resistance change type memory element.

The semiconductor memory device 100 includes the peripheral part 24 (a peripheral circuit part), the core part 26 (a core circuit part), the pre-decoder 3, the wiring 50 (the first wiring), the wiring 70 (the second wiring), the level shifter 5, and the memory cell array 18. The peripheral part 24 is supplied with the first power supply voltage VDDL (a first voltage). The core part 26 is supplied with the second power supply voltage VDDH (the second voltage) greater than the first power supply voltage VDDL. The pre-decoder 3 is provided in the peripheral part 24, receives a plurality of address signals, and outputs a pre-decode signal (the one hot signal) that one of the plurality of received address signals changes. The wiring 50 is provided on the peripheral part 24 and is electrically connected to the pre-decoder 3 and supplied with the one-hot signal. The wiring 70 is provided in the core part 26. The level shifter 5 is provided in the peripheral part 24, supplied with the first power supply voltage VDDL and the second power supply voltage VDDH, and transfers the one-hot signal from the wiring 50 to the wiring 70. The memory cell array 18 is provided in the core part 26 and operates based on the transferred one-hot signal.

In the configuration of the semiconductor memory device 100 shown in FIG. 2, relative to the configuration of the semiconductor memory device 100 shown in FIG. 1, the I/O buffer 1 and the control circuit 2 are omitted, and the data read/write circuit 12, the column decoder 14, and the row decoder 16 are collectively referred to as a final decoder 11, and the plurality of non-volatile memories BLK (BLK1 to BLKp) included in the second circuit device 6 and the non-volatile memory part 10 are arranged on the wiring 70 so that it branches. In this embodiment, the peripheral part 24 is referred to as an LV (Low Voltage) region since the peripheral part 24 is supplied with the first power supply voltage VDDL (FIG. 1) and operates using the first power supply voltage VDDL. Further, in the present embodiment, the core part 26 is referred to as an HV (High Voltage) region since the core part 26 is supplied with the second power supply voltage VDDH (FIG. 2) and operates using the second power supply voltage VDDH.

For example, in the semiconductor memory device, when the level shifter is provided in the vicinity of an end (e.g., just before the non-volatile memory part) of the wiring that supplies the pre-decode signal, an area overhead of the level shifter becomes large. For example, in the semiconductor memory device, when an operating voltage of the non-volatile memory part is large, the wiring for transferring the pre-decode signal to the non-volatile memory part becomes long. As a result, when the pre-decode signal is transferred to the non-volatile memory part via the level shifter, the power consumed by the semiconductor memory device increases. On the other hand, the configuration of the semiconductor memory device 100 according to the present embodiment includes the level shifter 5 in the LV region (the peripheral part 24), makes the pre-decode signal the one-hot signal, and can transfer the one-hot signal from the LV region to an HV region (a core part 26) via the level shifter 5. As a result, by using the semiconductor memory device 100, it is possible to suppress an area overhead of the level shifter 5 can be suppressed and the power consumed by the semiconductor memory device. That is, by using the semiconductor memory device 100, the one-hot signal, which the energy consumption associated with the transfer of the signal is suppressed, can be transferred over circuit parts operating by different power supplies. As a result, it is possible to suppress both the area overhead of the level shifter 5 and the power consumption of the semiconductor memory device 100.

<1-2. Configuration from Pre-Decoder 3 to Second Circuit Device 6>

Figure 3:
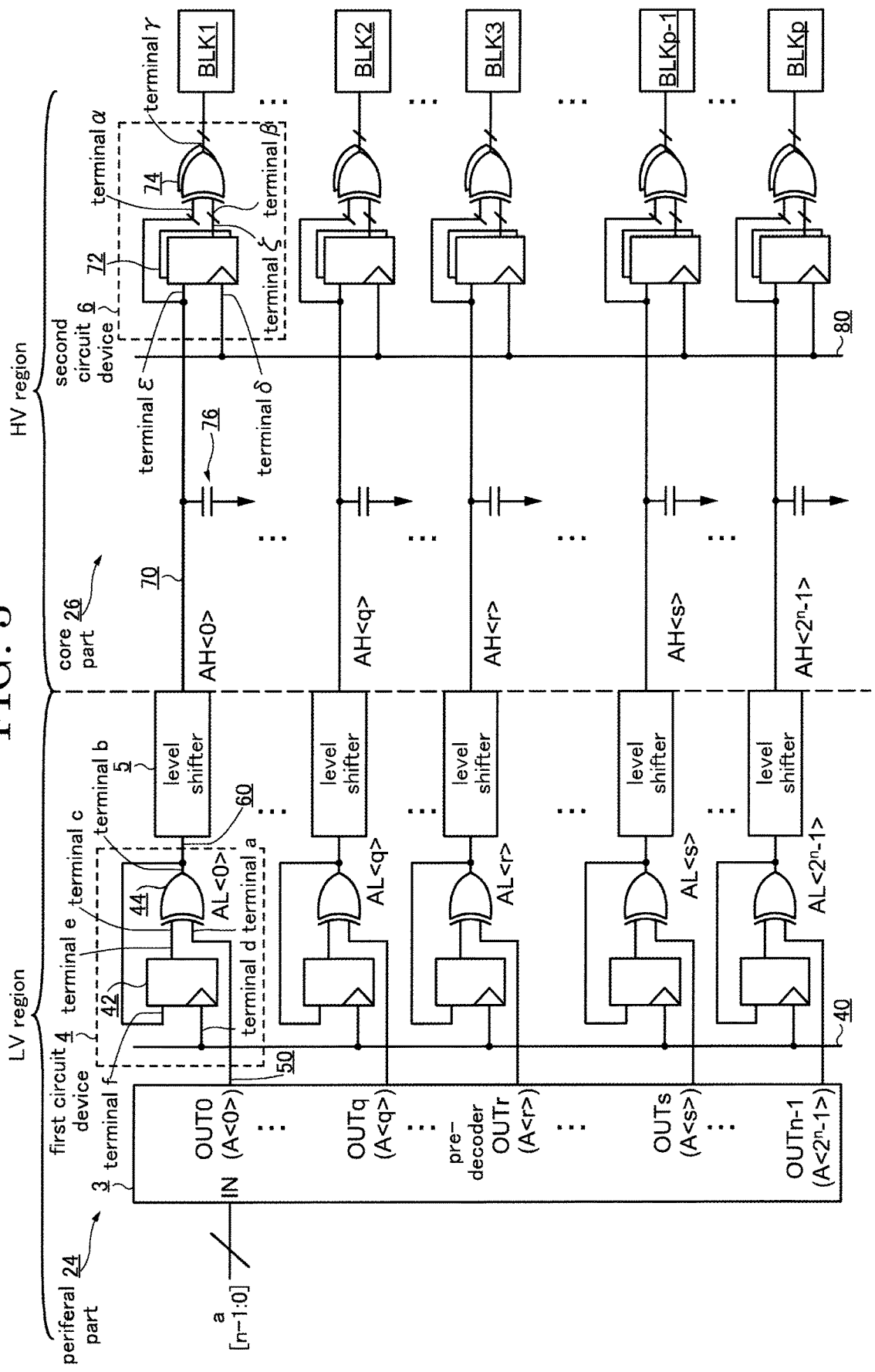
FIG. 3 is a block diagram showing a configuration from a pre-decoder to a second circuit device according to the first embodiment.
Figure 4:
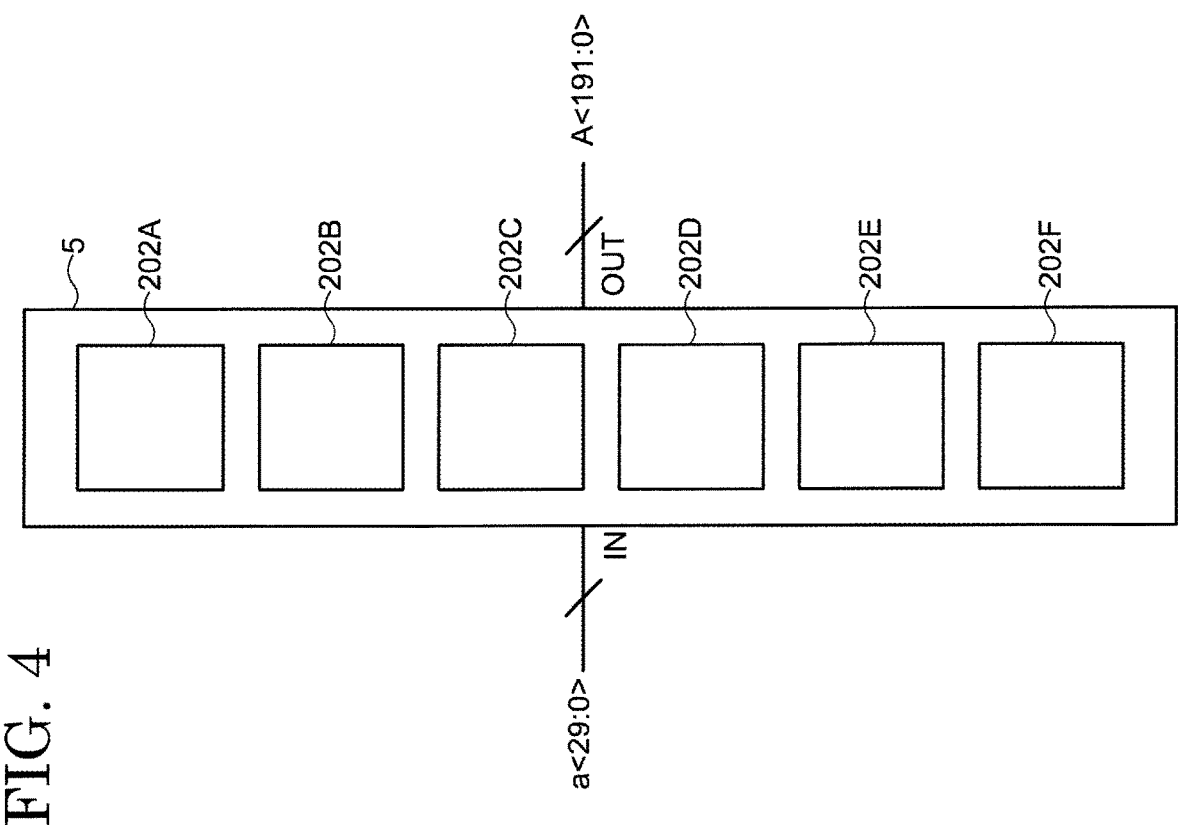
FIG. 4 is a block diagram showing a configuration of a pre-decoder according to the first embodiment.
Figure 5A:
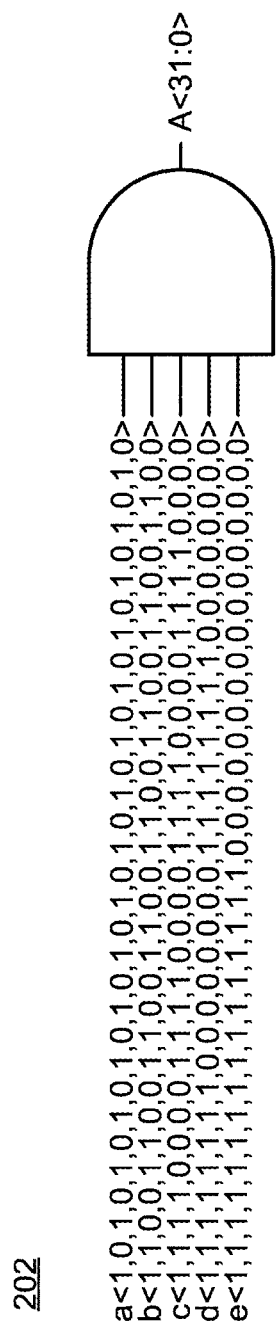
FIG. 5A is a circuit diagram of a pre-decoder according to the first embodiment.
Figure 5B:
FIG. 5B is a circuit diagram of an inverter according to the first embodiment.
Figure 6A:
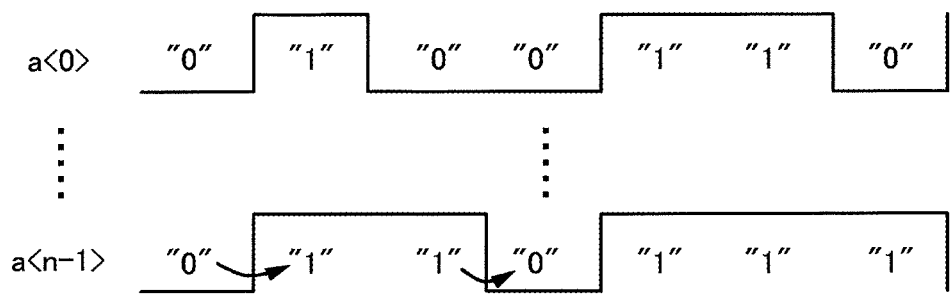
FIGS. 6A, 6B, and 6C are diagrams for explaining a one-hot signal in a semiconductor memory device according to the first embodiment.
Figure 6B:
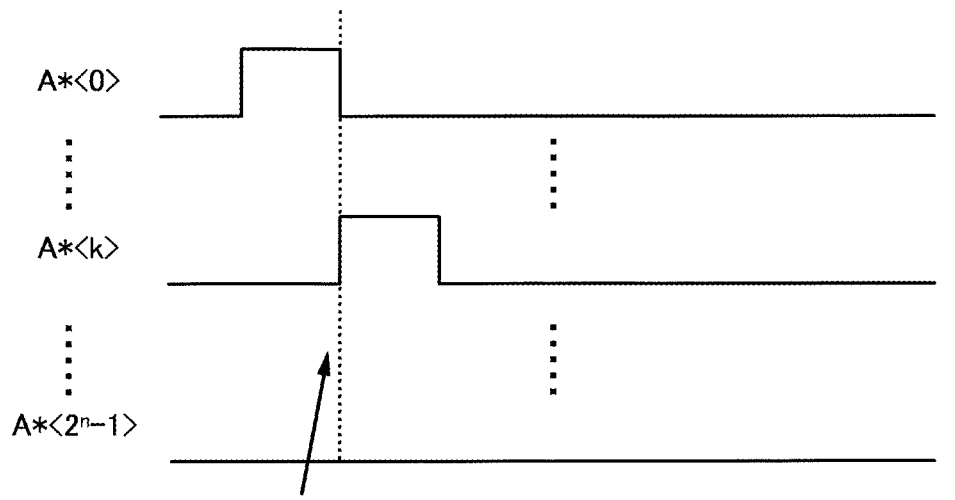
Figure 6C:
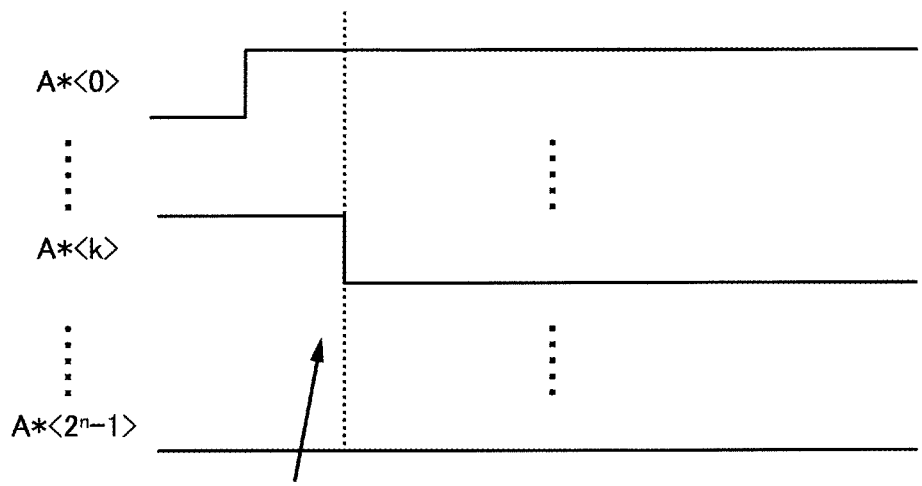
Figure 7:
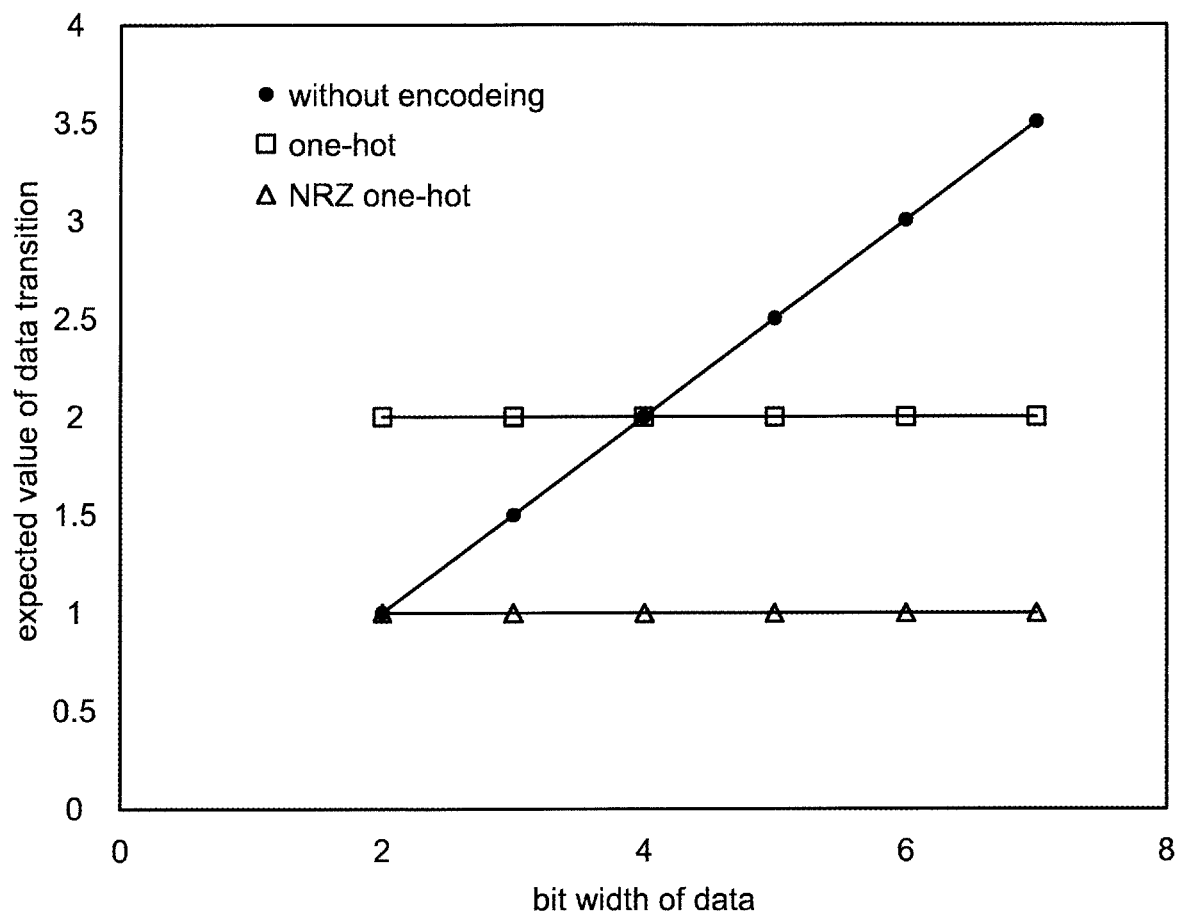
FIG. 7 is a diagram for explaining an expected value of data transition.

FIG. 3 is a block diagram showing a configuration from the pre-decoder 3 to the second circuit device 6 included in the semiconductor memory device 100 according to the present embodiment. FIG. 4 is a block diagram showing a configuration of the pre-decoder 3 according to the present embodiment. FIGS. 5A and 5B are circuit diagrams showing an example of the pre-decoder according to the present embodiment. FIGS. 6A, 6B, and 6C are diagrams for explaining the one-hot signal in the semiconductor memory device 100 according to the present embodiment. FIG. 7 is a diagram for explaining an expected value of data transition. The configuration of the semiconductor memory device 100 according to the present embodiment is not limited to the configuration shown in FIGS. 3 to 7. Descriptions of the same or similar components as those in FIGS. 1 and 2 may be omitted.

As shown in FIG. 3, the pre-decoder 3 receives, for example, an n-bit address signal a<n−1:0> from the control circuit 2 to an input terminal IN, and generates pre-decoded signals (pre-decode signals) A<0>, A<q>, A<r>, A<s>, A<$2^n$−1> in response to the n-bit address signal a<n−1:0>. The pre-decoder 3 outputs the pre-decode signals A<0>, A<q>, A<r>, A<s>, . . . A<$2^n$−1> from output terminals OUT0, . . . OUTq, . . . OUTr, . . . OUTs, . . . OUT$2^n$−1 to the first circuit device 4. The numerical value q is a positive natural number that is 0<q<r, the numerical value r is a positive natural number that is q<r<s, and the numerical value s is a positive natural number that is r<s<$2^n$−1. Each of the output terminals OUT of the pre-decoder 3 electrically connects the first circuit device 4 and the non-volatile memory BLK described with reference to FIGS. 1 and 2.

The first circuit device 4 includes a first DFF (D-flip-flop) circuit 42 and a first XOR circuit 44 electrically connected to the first DFF circuit 42. The first DFF circuit 42 has an input terminal d, an input terminal f, and an output terminal e. The first XOR circuit 44 has an input terminal a, an input terminal c, and an output terminal b. The input terminal d is electrically connected to a wiring 40, the input terminal f is electrically connected to the output terminal b, the output terminal e is electrically connected to the input terminal c, the input terminal a is electrically connected to the pre-decoder 3 (e.g., the wiring 50 electrically connected to the output terminal OUT0), the output terminal b is electrically connected to the wiring 60. The first circuit device 4 is provided between the pre-decoder 3 (the wiring 50) and the level shifter 5 (the wiring 60), is electrically connected to the pre-decoder 3 (the wiring 50) and the level shifter 5 (the wiring 60).

The level shifter 5 receives a signal based on the pre-decode signal A<0> (AL<0>), generates and outputs a one-hot signal AH<0>, receives a signal based on the pre-decode signal A<q> (AL<q>), generates and outputs a one-hot signal AH<q>, receives a signal based on the pre-decode signal A<r> (AL<r>), generates and outputs a one-hot signal AH<r>, receives a signal based on the pre-decoded signal A<s> (AL<s>), generates and outputs a one-hot signal AH<s>, receives a signal based on the pre-decode signal A<$2^n-1$> (AL<$2^n-1$>), and generates and outputs a one-hot signal AH<$2^n-1$>. The wiring 70 includes a parasitic capacitance 76.

The second circuit device 6 includes a second DFF circuit 72 and a second XOR circuit 74 electrically connected to each of a plurality of second DFF circuits 72. Each of the second DFF circuits 72 has an input terminal δ, an input terminal ε, and an output terminal ζ. Each of the second XOR circuits 74 has an input terminal α, an input terminal β, and an output terminal γ. The input terminal δ is electrically connected to a wiring 80, the input terminal ε is electrically connected to the level shifter 5, the wiring 70, and the input terminal α, the output terminal ζ is electrically connected to the input terminal β, the output terminal γ is electrically connected to non-volatile memory BLK (BLK1 to BLKp). The second circuit device 6 is provided between the level shifter 5 (the wiring 70) and the non-volatile memory BLK (BLK1 to BLKp), is connected to the level shifter 5 (the wiring 70) and the non-volatile memory BLK (BLK1 to BLKp).

Figure 8:
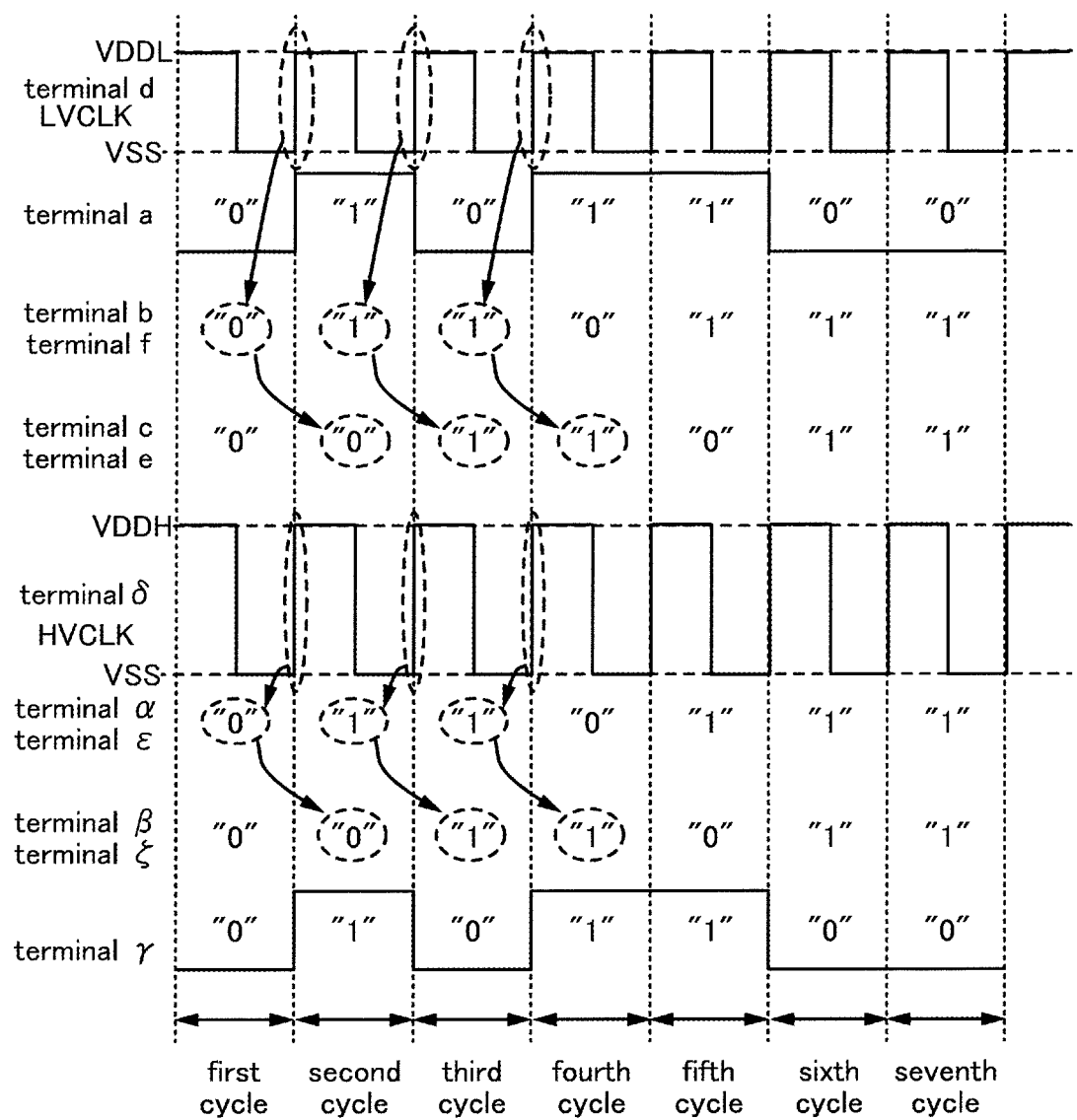
FIG. 8 is a diagram showing a timing chart in a semiconductor memory device according to the first embodiment.

The wiring 40 is supplied with, for example, a low voltage level clock signal LVCLK (FIG. 8). The wiring 80 is supplied with, for example, a clock signal HVCLK of a voltage level greater than the voltage level of the low voltage (voltage level of the high voltage) (FIG. 8). The clock signal LVCLK and the clock signal HVCLK, for example, may be supplied from the external controller (not shown) to the semiconductor memory device 100 or supplied from a clock generation circuit such as PLL provided inside the semiconductor memory device 100 to each circuit device.

As shown in FIG. 4, the pre-decoder 3 receives, for example, 30 (n=30) bits address signal and outputs 192 pieces of pre-decode signals A<191:0>. The pre-decoder 3 has, for example, six sets of 5-input AND 202 (202A to 202F). One set of the 5-input AND 202 (e.g., 202A) has a configuration as shown in FIGS. 5A and 5B. One set of the 5-input AND 202 receives 5 bits of the 30 (n=30) bits address signal and outputs 32 pieces of pre-decode signals A<31:0>.

As shown in FIG. 5A, one set of 5-input AND 202 (e.g., 202A) has 32 pieces of 5-input AND. As shown in FIG. 5B, five sets of an inverter 203 receives each of the address signals (a<0>, b<0>, c<0>, d<0>, e<0>), and outputs inverted signals (a<1>, b<1>, c<1>, d<1>, e<1>) of the address signals. The 32 pieces of 5-input AND are configured to input with all combinations ($2^5$=32) that the logical value of the 5-bit address signals (a<0>, b<0>, c<0>, d<0>, e<0>) and the logical value of the inverted signals (a<1>, b<1>, c<1>, d<1>, e<1>) of the 5-bit address signals are different from each other. For example, the output of the 5-input AND to which the 5-bit address signals a<0>, b<0>, c<0>, d<0>, and e<0> are input is the pre-decode signal A<0>, the output of the 5-input AND to which the 5-bit address signals a<1>, b<0>, c<0>, d<0>, and e<0> are input is the pre-decode signal A<1>, and the output of the 5-input AND to which the 5-bit address signals a<0>, b<1>, c<0>, d<0>, and e<0> are input is the pre-decode signal A<2>, and the output of the 5-input AND to which the 5-bit address signals a<1>, b<1>, c<0>, d<0>, and e<0> are input is the pre-decode signal A<3>, the output of the 5-input AND to which the 5-bit address signals a<0>, b<1>, c<1>, d<1>, and e<1> are input is the pre-decode signal A<30>, and the 5-bit address signals a<1>, b<1>, c<1>, d<1>, and e<1> are input is the pre-decode signal A<31>. The pre-decoder 3 according to the present embodiment outputs the one-hot signal that only one of 32 pieces of 5-input AND constituting one set of 5-input AND 202 outputs the logical value "1". For example, when the address signals a<0>, b<0>, c<0>, d<0>, and e<0> are all logical values "1", only the 5-input AND to which the address signals a<0>, b<0>, c<0>, d<0>, and e<0> of one set of 5-input AND 202A are input outputs the logical value "1". That is, among the pre-decode signal A<31:0>, only the pre-decode signal A<0> is a signal that becomes the logical value "1", and the remaining 31 pieces of pre-decode signals A<31:1> are signals that becomes the logical value "0".

In the semiconductor memory device 100 according to the present embodiment, for example, a signal based on the pre-decode signal (the one-hot signal) generated at the 5-input AND 202A among six sets of 5-input AND 202 (202A to 202F) is supplied to the row decoder 16 of the non-volatile memory BLK1, and a signal based on the pre-decode signal (the one-hot signal) generated at the 5-input AND 202B among six sets of 5-input AND 202 (202A to 202F) is supplied to the column decoder 14 of the non-volatile memory BLK1. Consequently, the semiconductor memory device 100 according to the present embodiment can write data to the non-volatile memory elements in the memory cell array 18 selected using the signal based on the pre-decode signal (the one-hot signal) generated at the 5-input AND 202A and the signal based on the pre-decode signal (the one-hot signal) generated at the 5-input AND 202B or can read data from the non-volatile memory elements.

The semiconductor memory device 100 according to the present embodiment can generate the one-hot signal at the peripheral part 24 (the LV region) by using the pre-decoder 3 shown in FIG. 5A and FIG. 5B.

As shown in FIG. 6A, in a certain device, for example, n-bit random data a<0> to a<n-1> are transferred. As shown by arrows in FIG. 6A, in the random data a<n-1>, the data transition is either from the logical value "0" to the logical value "1" or from the logical value "1" to the logical value "0". Therefore, in the transfer of n-bit random data, the expected value of data transition is an average of n/2 times per one data transfer. In FIG. 7, the horizontal axis represents the bit width (the number of bits) of data, and the vertical axis represents the expected value of data transition. FIG. 7 shows an n-bit random data transfer "without encoding", for example, in 4-bits random data transfer, the expected value of data transition is 2 times. However, as the number of bits of the random data increases, the expected value of data transition also increases.

As shown in FIG. 6B, in a certain device, for example, n-bit random data is converted into one-hot signals A*<0> to A*<2n-1> and transferred. As shown by an arrow in FIG. 6B, in the one-hot signal, the data transition is twice from the logical value "0" to the logical value "1" and from the logical value "1" to the logical value "0". Further, as shown by the arrow in FIG. 6B, for example, the falling of the one-hot signal A*<0> and the rising of the one-hot signal A*<k> may occur at the same time. In FIG. 7, the transfer of the one-hot signal is indicated by "one-hot", for example, in 2-bits random data transfer, the expected value of data transition is twice. The one-hot signal is, for example, an RZ (Return to Zero) one-hot.

On the other hand, in the semiconductor memory device 100 according to the present embodiment, as shown by an arrow in FIG. 6C, n-bit random data is converted into the one-hot signal A*<0> to A*<2n-1>, only one bit becomes the logical value "1" and transferred. In FIG. 7, the data transfer of the semiconductor memory device 100 according to the present embodiment is indicated by "NRZ (Non Return to Zero) one-hot", and, for example, in 5-bits random data transfer, the expected value of data transition is once. In the semiconductor memory device 100 according to the present embodiment, n-bit random data is n-bit address signal.

In the semiconductor memory device 100 according to the present embodiment, since using the one-hot signal (NRZ one-hot signal), even when a distance from the level shifter 5 to the second circuit device 6 is long and the parasitic capacitance 76 is large, it is possible to suppress the energy consumption associated with the transfer of the signal. The first semiconductor memory device 100 according to the present embodiment may be configured to generate the pre-decode signal of an RZ one-hot signal.

<1-3. Example of Operation of Semiconductor Memory Device 100 According to the Present Embodiment>

Figure 9A:
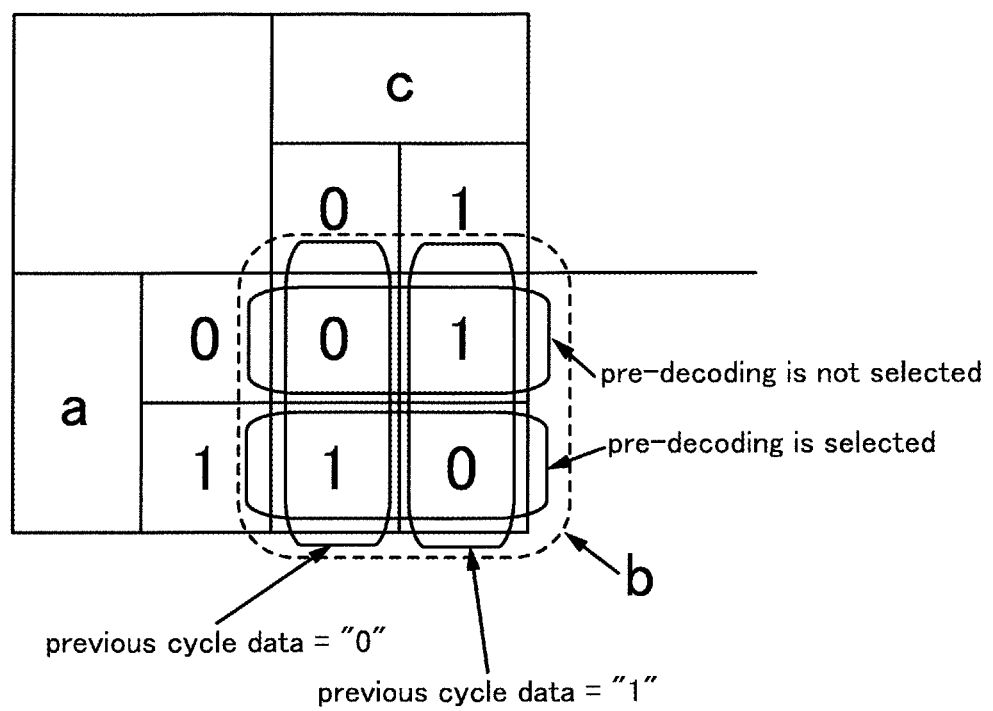
FIG. 9A is a diagram showing a truth table of a first circuit device according to the first embodiment.
Figure 9B:
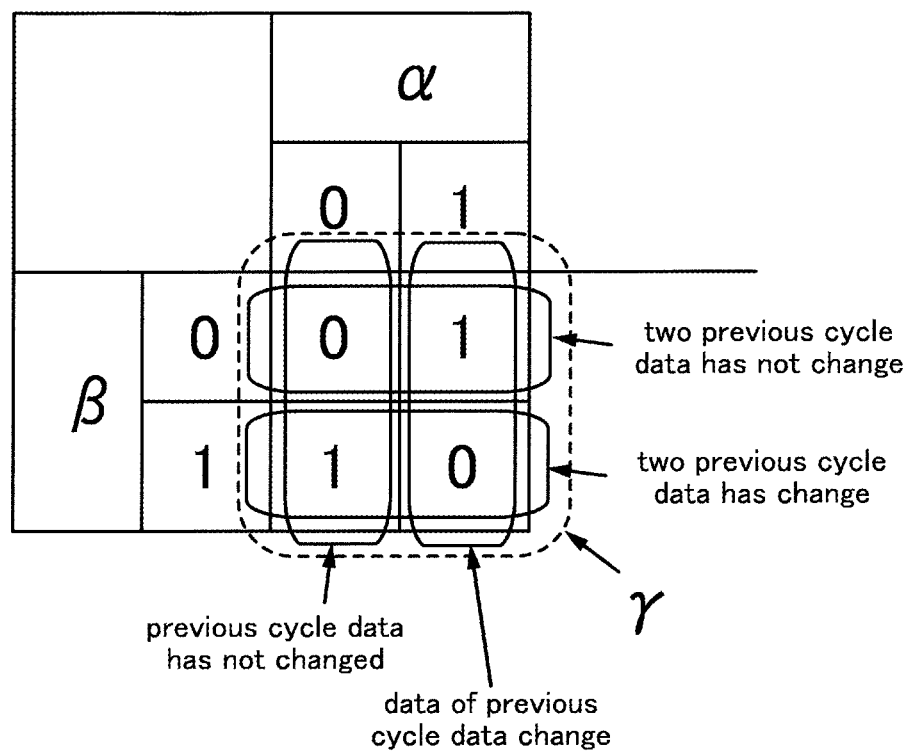
FIG. 9B is a diagram showing a truth table of the second circuit device according to the first embodiment.

FIG. 8 is a diagram showing a timing chart in the semiconductor memory device 100 according to the present embodiment. FIGS. 9A and 9B are a diagram showing a truth table of the first circuit device 4 and the second circuit device 6 according to the present embodiment. The timing chart and the truth table in the semiconductor memory device 100 according to the present embodiment are not limited to the configurations shown in FIGS. 8, 9A and 9B. Descriptions of the same or similar components as those of FIGS. 1 to 7 may be omitted.

Operation of the semiconductor memory device 100 will be described with reference to FIGS. 3 and 8. As shown in FIG. 8, for example, the input terminal d of the first DFF circuit 42 is supplied with the low voltage level clock signal LVCLK from the wiring 40. For example, the input terminal f of the first DFF circuit 42 receives a first signal including the logical value "1", the logical value "1", the logical value "1", the logical value "0", the logical value "1", the logical value "1", the logical value "1", the logical value "0" for each cycle of the 7th cycle, 6th cycle, 5th cycle, 4th cycle, 3rd cycle, 2nd cycle, and 1st cycle. The input terminal f of the first DFF circuit 42 captures, for example, the logical value of the first signal by using a rising edge of the clock signal LVCLK as a trigger (edge trigger), and the first DFF circuit 42 stores the captured logical value of the first signal. Subsequently, the first DFF circuit 42 outputs the fourth signal including the logical value "1", the logical value "1", the logical value "0", the logical value "1", the logical value "1", the logical value "0", the logical value "0" for each cycle of the 7th cycle, 6th cycle, 5th cycle, 4th cycle, 3rd cycle, 2nd cycle, and 1st cycle to the output terminal e. At this time, the input terminal f of the first DFF circuit 42 captures the first signal including the logical value "1", the logical value "1", the logical value "0", the logical value "1", the logical value "1", the logical value "0" for each cycle of the 7th cycle, 6th cycle, 5th cycle, 4th cycle, 3rd cycle, and 2nd cycle, and the first DFF circuit 42 stores the captured logic value of the first signal. The timing of the clock shown in FIG. 8 is only an example and is not limited to the timing shown here. For example, a falling edge of clock signal LVCLK may be the edge trigger, and the pulse width of the clock may be aperiodic. FIG. 8 shows an example of using a clock as an example of a signal to be triggered, the signal to be triggered is not limited to the clock.

For example, the input terminal a of the first XOR circuit 44 receives the pre-decode signal (the one-hot signal) A<0> from the output terminal OUT of the pre-decoder 3, for example. The pre-decode signal (the one-hot signal) A<0> includes, for example, logical value "0", the logical value "0", the logical value "1", the logical value"1", the logical value "0", the logical value "1", the logical value "0" for each cycle of the 7th cycle, 6th cycle, 5th cycle, 4th cycle, 3rd cycle, 2nd cycle, and 1st cycle. Further, the input terminal c of the first XOR circuit 44 receives the fourth signal from the input terminal e. As a result, the first XOR circuit 44 generates a first calculation result including the logical value "1", the logical value "1", the logical value "1", the logical value "0", the logical value "1", the logical value "1", and the logical value "0" for each cycle of the 7th cycle, 6th cycle, 5th cycle, 4th cycle, 3rd cycle, 2nd cycle, and 1st cycle, and outputs the first signal including the first calculation result to the output terminal b. The output terminal b is electrically connected to the wiring 60, and the wiring 60 is supplied with the first signal including the first calculation result.

Subsequently, the level shifter 5 receives the first signal including the first calculation result including the logical value "1", the logical value "1", the logical value "1", the logical value "0", the logical value "1", the logical value "1", and the logical value "0" for each cycle of the 7th cycle, 6th cycle, 5th cycle, 4th cycle, 3rd cycle, 2nd cycle, and 1st cycle. Further, the level shifter 5 outputs a second signal that the first calculation result including the logical value "1", the logical value "1", the logical value "1", the logical value "0", the logical value "1", the logical value "1", the logical value "0" are level sifted for each cycle of the 7th cycle, 6th cycle, 5th cycle, 4th cycle, 3rd cycle, 2nd cycle, and 1st cycle to the wiring 70 and the input terminal ε of the second circuit device 6 electrically connected to the wiring 70. For example, the level shifter 5 receives the first signal that is a voltage level of the first power supply voltage VDDL and outputs the second signal that is a voltage level of the second power supply voltage VDDH. The level shifter 5 may, for example, have a configuration in which the logical value "1" is shifted from the voltage level of the first power supply voltage VDDL to the voltage level of the second power supply voltage VDDH and the logical value "0" is not level shifted. The level shifter 5 may have a configuration in which the logical value "0" is shifted from the voltage level of the first power supply voltage VDDL to the voltage level of the second power supply voltage VDDH and the logical value "1" is not level shifted. The level shifter 5 may have a configuration in which the logical value "1" is shifted to a voltage level lower than the voltage level of the first power supply voltage VDDL and the logical value "0" is shifted from a voltage level lower than the voltage level of the first power supply voltage VDDL to a voltage level of the second power supply voltage VDDH. The voltage level lower than the voltage level of the first power supply voltage VDDL is, for example, a low voltage power supply VSS.

Subsequently, the input terminal δ of the second DFF circuit 72 is supplied with the clock signal HVCLK having a high voltage level from the wiring 80. The input terminal ε of the second DFF circuit 72 receives the second signal obtained by level-shifting the first calculation result including the logical value "1", the logical value "1", the logical value "1", the logical value "0", the logical value "1", the logical value "1", and the logical value "0" for each cycle of the 7th cycle, 6th cycle, 5th cycle, 4th cycle, 3rd cycle, 2nd cycle, and 1st cycle. The input terminal ε of the second DFF circuit 72, for example, captures the logical value of the second signal by using a rising edge of the clock signal HVCLK as a trigger (edge trigger), and the second DFF circuit 72 stores the captured logical value of the second signal. Subsequently, by using a rising edge of the clock signal HVCLK as a trigger (edge trigger), the second DFF circuit 72 outputs a fifth signal including the logical value "1", the logical value "1", the logical value "0", the logical value "1", the logical value "1", the logical value "0", the logical value "0" for each cycle of the 7th cycle, 6th cycle, 5th cycle, 4th cycle, 3rd cycle, 2nd cycle, and 1st cycle. At this time, the input terminal ε of the second DFF circuit 72 captures the second signal including the logical value "1", the logical value "1", the logical value "1", the logical value "0", the logical value "1", and the logical value "1" for each cycle of the 7th cycle, 6th cycle, 5th cycle, 4th cycle, 3rd cycle, and 2nd cycle, and the second DFF circuit 72 stores the logic value of the captured second signal.

For example, the input terminal α of the second XOR circuit 74 receives the second signal from the level shifter 5. The input terminal β of the second XOR circuit 74 receives the fifth signal from the output terminal ζ of the second DFF circuit 72. As a result, the second XOR circuit 74 generates a second calculation result including the logical value "0", the logical value "0", the logical value "1", the logical value "1", the logical value "0", the logical value "1", and the logical value "0" for each cycle of the 7th cycle, 6th cycle, 5th cycle, 4th cycle, 3rd cycle, 2nd cycle, and 1st cycle, and outputs a third signal including the second calculation result to the output terminal γ. The output terminal γ is electrically connected to the non-volatile memory BLK (BLK1 to BLKp), and the non-volatile memory BLK (BLK1 to BLKp) is supplied with the third signal including the second calculation result.

For example, focus on the second cycle in FIG. 8. As shown by arrows in FIG. 8, by using the rising edge of the clock signal LVCLK input to the input terminal d of the first DFF circuit 42 as a trigger (edge trigger), the first DFF circuit 42 captures and stores the logical value "0" of the first cycle from the input terminal f and outputs the fourth signal including the logical value "0" to the output terminal e in the second cycle. In the second cycle, the first XOR circuit 44 receives the logical value "1" to the input terminal a, receives the logical value "0" to the input terminal c, generates the logical value "1" which is the first calculation result, and outputs the first signal including the logical value "1" which is the first calculation result to the output terminal b and the input terminal f. In the second cycle, the level shifter 5 receives the first signal including the logical value "1" which is the first calculation result, and outputs the second signal obtained by level-shifting the logical value "1" which is the first calculation result to the input terminal ε of the second circuit device 6 electrically connected to the wiring 70 and the wiring 70. As shown by the arrows in FIG. 8, by using the rising edge of the clock signal HVCLK input to the input terminal δ of the second DFF circuit 72 as a trigger (edge trigger), the second DFF circuit 72 captures and stores the logical value "0" of the first cycle from the input terminal α and outputs the fifth signal including the logical value "0" to the output terminal ζ in the second cycle. In the second cycle, the second XOR circuit 74 receives the second signal including the logical value "1" to the input terminal α, receives the fifth signal including the logical value "0" to the input terminal β electrically connected to the output terminal ζ, generates the logical value "1" which is the second calculation result using the logical value "1" and the logical value "0", and outputs the third signal including the logical value "1" which is the second calculation result to the output terminal γ.

Similarly, focus on the third cycle following the second cycle. By using the rising edge of the clock signal LVCLK input to the input terminal d of the first DFF circuit 42 as a trigger (edge trigger), the first DFF circuit 42 captures and stores the logical value "1" of the second cycle from the input terminal f and outputs the fourth signal including the logical value "1" to the output terminal e in the third cycle. In the third cycle, the first XOR circuit 44 receives the logical value "0" to the input terminal a, receives the logical value "1" to the input terminal c, generates the logical value "1" which is the first calculation result, and outputs the first signal including the logical value "1" which is the first calculation result to the output terminal b and the input terminal f. In the third cycle, the level shifter 5 receives the first signal including the logical value "1" which is the first calculation result, and outputs the second signal obtained by level-shifting the logical value "1" which is the first calculation result to the input terminal ε of the second circuit device 6 electrically connected to the wiring 70 and the wiring 70. By using the rising edge of the clock signal HVCLK input to the input terminal δ of the second DFF circuit 72 as a trigger (edge trigger), the second DFF circuit 72 captures and stores the logical value "1" of the second cycle from the input terminal α and outputs the fifth signal including the logical value "1" in the output terminal ζ in the third cycle. In the third cycle, the second XOR circuit 74 receives the second signal including the logical value "1" to the input terminal α, receives the fifth signal including the logical value "1" to the input terminal β electrically connected to the output terminal ζ, generates the logical value "0" which is a second calculation result using two logic values "1", and outputs the third signal including the logical value "0" which is the second calculation result to the output terminal γ.

Similarly, focus on the fourth cycle following the third cycle. By using the rising edge of the clock signal LVCLK input to the input terminal d of the first DFF circuit 42 as a trigger (edge trigger), the first DFF circuit 42 captures and stores the logical value "1" of the third cycle from the input terminal f and outputs the fourth signal including the logical value "1" in the output terminal e in the fifth cycle. In the fourth cycle, the first XOR circuit 44 receives the logical value "1" to the input terminal a, receives the logical value "1" to the input terminal c, generates the logical value "0" which is the first calculation result, and outputs the first signal including the logical value "0" which is the first calculation result to the output terminal b and the input terminal f. In the fourth cycle, the level shifter 5 receives the first signal including the logical value "0" which is the first calculation result, and outputs the second signal obtained by level-shifting the logical value "0" which is the first calculation result to the input terminal ε of the second circuit device 6 electrically connected to the wiring 70 and the wiring 70. By using the rising edge of the clock signal HVCLK input to the input terminal δ of the second DFF circuit 72 as a trigger (edge trigger), the second DFF circuit 72 captures and stores the logical value "1" of the third cycle from the input terminal α and outputs the fifth signal including the logical value "1" to the output terminal ζ in the fourth cycle. In the fourth cycle, the second XOR circuit 74 receives the second signal including the logical value "0" to the input terminal α, receives the fifth signal including the logical value "1" to the input terminal β electrically connected to the output terminal ζ, generates the logical value "1" which is the second calculation result using the logical value "0" and the logic value "1", and outputs the third signal including the logical value "1" which is the second calculation result to the output terminal γ.

Summarizing the above, a truth table of the first XOR circuit 44 becomes the truth table shown in FIG. 9A, a truth table of the second XOR circuit 74 becomes the truth table shown in FIG. 9B.

In the first XOR circuit 44, as shown in FIG. 9A, when a signal including the logical value "0" is input to the input terminal a, for example, a pre-decoding is not selected (when the one-hot signal is a signal including the logical value "0"), and when a signal including the logical value "1" is input to the input terminal a, for example, a pre-decoding is selected (when the one-hot signal is a signal including the logical value "1"). The input terminal c receives the logical value of the previous cycle (previous cycle data). When a signal including the logical value "0" is input to the input terminal a and a signal including the logical value "0" of the previous cycle (previous cycle data="0") is input to the input terminal c, the first signal including the logical value "0" which is the first calculation result is output to the output terminal b. When a signal including the logical value "0" is input to the input terminal a and a signal including the logical value "1" of the previous cycle (previous cycle data="1") is input to the input terminal c, the first signal including the logical value "1" which is the first calculation result is output to the output terminal b. When a signal including the logical value "1" is input to the input terminal a and a signal including the logical value "0" of the previous cycle (previous cycle data="0") is input to the input terminal c, the first signal including the logical value "1" which is the first calculation result is output to the output terminal b. When a signal including the logical value "1" is input to the input terminal a and a signal including the logical value "1" of the previous cycle (previous cycle data="1") is input to the input terminal c, the first signal including the logical value "0" which is the first calculation result is output to the output terminal b.

In the second XOR circuit 74, as shown in FIG. 9B, when a signal including the logical value "0" is input to the input terminal a, for example, is the case that the logical value of the current cycle has not changed from the logical value of the previous cycle (when the previous cycle data has not changed), and when a signal including the logical value "1" is input to the input terminal a, for example, is the case that the logical value of the current cycle has changed from the logical value of the previous cycle (when the previous cycle data has changed). The result of comparison between the logic value of a two previous cycles (a two previous cycle data) and the logic value of the previous cycle (a one previous cycle data) is input to the input terminal β (the two previous cycle data has not changed or the two previous cycle data has changed). When a signal including the logical value "0" is input to the input terminal α and a signal including the logical value "0" (the two previous cycle data has not changed) is input to the input terminal β, the third signal including the logical value "0" which is the second calculation result is output to the output terminal γ. When a signal including the logical value "0" is input to the input terminal α and a signal including the logical value "1" (the two previous cycle data has changed) is input to the input terminal β, the third signal including the logical value "1", which is the second calculation result is output to the output terminal γ. When a signal including the logical value "1" is input to the input terminal α and a signal including the logical value "0" (the two previous cycle data has not changed) is input to the input terminal β, the third signal including the logical value "1" which is the second calculation result is output to the output terminal γ. When a signal including the logical value "1" is input to the input terminal α and a signal including the logical value "1" (the two previous cycle data has changed) is input to the input terminal β, the third signal including the logical value "0", which is the second calculation result, is output to the output terminal γ.

The semiconductor memory device 100 according to the present embodiment compares, by using the first circuit device 4, the logical value (the logical value of the current cycle) included in the pre-decode signal (the one hot signal) generated by the pre-decoder 3 with the logical value (the logical value of the previous cycle (previous cycle data), the logical value included in the fourth signal) included in the pre-decode signal (the one-hot signal) stored in the previous cycle. As a result of the comparison, when the logical value of the present cycle is different from the logical value of the previous cycle, the semiconductor memory device 100 according to the present embodiment outputs the first signal including the logical value "1" having the voltage level of the first power supply voltage VDDL from the first XOR circuit 44. Further, as a result of the comparison, when the logical value of the present cycle is the same as the logical value of the previous cycle, the semiconductor memory device 100 according to the present embodiment outputs the first signal including the logical value "0" of the voltage level lower than the first power supply voltage VDDL from the first XOR circuit 44.

When the result of the comparison between the logical value of the cycle that is two previous and the logical value of the previous cycle is different from the result of the comparison between the logical value of the previous cycle and the logical value of the current cycle, the semiconductor memory device 100 according to the present embodiment outputs the third signal including the logical value "1" having the voltage level of the second power supply voltage VDDH from the second XOR circuit 74 by using the second circuit device 6. When the result of the comparison between the logical value of the cycle that is two previous and the logical value of the previous cycle is the same as the result of the comparison between the logical value of the previous cycle and the logical value of the current cycle, the semiconductor memory device 100 according to the present embodiment outputs the third signal including the logical value "0" of a voltage level lower than the second power supply voltage VDDH from the second XOR circuit 74.

As described above, the semiconductor memory device 100 according to the present embodiment executes exclusive OR twice using the first XOR circuit 44 and the second XOR circuit 74, and the third signal including the logical value "1" having the voltage level of the second power supply voltage VDDH can be the pre-decode signal (the one-hot signal) including the logical value "1", and the third signal including the logical value "0" of the voltage level lower than the second power supply voltage VDDH can be the remaining pre-decode signal (the one-hot signal) not including the logical value "1".

As described above, since the semiconductor memory device 100 according to the present embodiment can grasp the change in the pre-decoded signal (the one hot signal) using only the signal logical value has changed, it does not need to constantly grasp the rising and falling of the signal of each address signal. Consequently, by using the semiconductor memory device 100 according to the present embodiment, it is possible to suppress the consumed energy associated with transferring the signal.

The semiconductor memory device 100 includes the first circuit device 4 and the second circuit device 6. The first circuit device 4 is provided in the peripheral part 24 (the peripheral circuit part), is electrically connected between the wiring 50 (the first wiring) and the level shifter 5, operates at the first power supply voltage VDDL (the first voltage). The first circuit device 4 receives the logical value (a first value (a value of the one-hot signal)) of the pre-decode signal and outputs the first signal including the logical value "0" or the logical value "1" (the first calculation result). The level shifter 5 receives the first signal and outputs the second signal. The second signal includes a second value and a third value in time series according to a change with time of the logical value of the first signal. The second value and the third value are the logical value "0" or the logical value "1", respectively. The second circuit device 6 is provided in the core part 26 (the core circuit part), is electrically connected between the level shifter 5 and the memory cell array 18, operates at the second power supply voltage VDDH (the second voltage). The second circuit device 6 receives the second signal, and outputs the transferred one-hot signal (the third signal including the logical value (the second calculation result)). The memory cell array 18 receives a signal based on the third signal and operates.

The first circuit device 4 includes the first DFF circuit 42, and the first XOR circuit 44 electrically connected to the first DFF circuit 42. The first DFF circuit 42 receives the first signal and outputs the fourth signal including the logical value (a fourth value (a value of the fourth signal)). The first XOR circuit 44 receives the one-hot signal and the fourth signal, generates the first calculation result using the logical value (the first value) and the logic value (the fourth value), outputs the first signal including the first calculation result.

When the logical value (the first value) is different from the logical value (the fourth value), the first XOR circuit 44 generates the first calculation result of the level of the first power supply voltage VDDL and outputs the first signal including the first calculation result of the level of the voltage of the first power supply voltage VDDL. When the logical value (the first value) is the same as the logical value (the fourth value), the first XOR circuit 44 generates the first calculation result of the level of the voltage lower than the level of the first power supply voltage VDDL, and outputs the first signal including the first calculation result of the level of the voltage lower than the level of the voltage of the first power supply voltage VDDL.

The second circuit device 6 includes the second DFF circuit 72 and the second XOR circuit 74 electrically connected to the second DFF circuit 72. The second DFF circuit 72 receives the second signal including the logical value (a second value), stores the second value, and outputs the fifth signal including the logical value (the second value (a value of the fifth signal)) when receiving the second signal including the logical value (a third value (a value of the second signal)). The second XOR circuit 74 receives the fifth signal and the second signal, generates the second calculation result using the logical value (the value of the fifth signal) and the third value, and outputs the third signal including the second calculation result.

When the logical value (the value of the fifth signal) is different from the logical value (the third value), the second XOR circuit 74 generates the second calculation result having the voltage level of the second power supply voltage VDDH, and outputs the third signal including the second calculation result having the voltage level of the second power supply voltage VDDH. When the logical value (the value of the fifth signal) is the same as the logical value (the third value), the second XOR circuit 74 generates the second calculation result having the level of the voltage lower than the level of the voltage of the second power supply voltage VDDH, and outputs the third signal including the second calculation result of the level of the voltage lower than the level of the voltage of the second power supply voltage VDDH.

2. Second Embodiment

Figure 10:
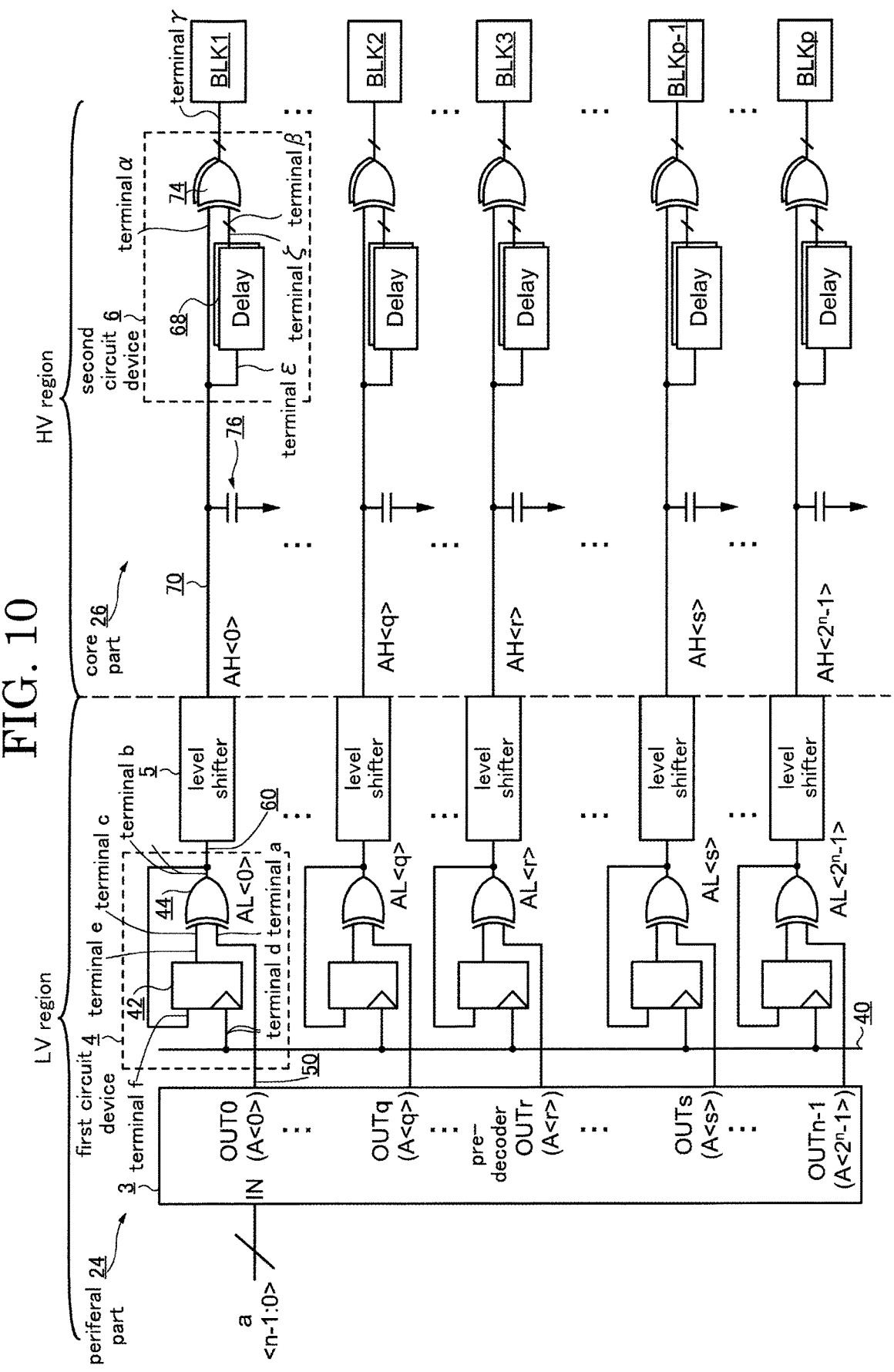
FIG. 10 is a block diagram showing a configuration from a pre-decoder to a second circuit device according to the second embodiment.

FIG. 10 is a block diagram showing a configuration from the pre-decoder 3 to the second circuit device 6 according to the second embodiment. In the second embodiment, the configuration of the second circuit device 6 is different from the configuration of the second circuit device 6 according to the first embodiment. Other configurations are the same as those of the first embodiment, and therefore, description thereof will be omitted. The configuration of the pre-decoder 3 to the second circuit device 6 according to the second embodiment is not limited to the configuration shown in FIG. 10. Descriptions of the same or similar components as those of FIGS. 1 to 9 may be omitted.

As shown in FIG. 10, the second circuit device 6 includes a delay circuit 68 and the second XOR circuit 74 electrically connected to each of the plurality of delay circuits 68. Each of the plurality of delay circuits 68 has the input terminal ε, and the output terminal ζ. Each of the second XOR circuit 74 has the input terminal α, the input terminal β, and the output terminal γ. The input terminal α is electrically connected to the input terminal ε, the level shifter 5, and the wiring 70, the output terminal ζ is electrically connected to the input terminal β, and the output terminal γ is electrically connected to the non-volatile memory BLK (BLK1 to BLKp). The second circuit device 6 is provided between the level shifter 5 (the wiring 70) and the non-volatile memory BLK (BLK1 to BLKp), is electrically connected to the level shifter 5 (the wiring 70) and the non-volatile memory BLK (BLK1 to BLKp).

In the second embodiment, similar to the first embodiment, a similar timing chart as in FIG. 8 and a similar truth table as in FIGS. 9A and 9B can be used. However, in the second embodiment, there is no input terminal δ, and the clock signal HVCLK is unnecessary for the second circuit device 6 of the second embodiment.

In the second embodiment, the level shifter 5 receives the first signal including the first calculation result including the logical value "1", the logical value "1", the logical value "1", the logical value "0", the logical value "1", the logical value "1", and the logical value "0" for each cycle of the 7th cycle, 6th cycle, 5th cycle, 4th cycle, 3rd cycle, 2nd cycle, and 1st cycle. Further, the level shifter 5 outputs the second signal obtained by level-shifting the first calculation result including the logical value "1", the logical value "1", the logical value "1", the logical value "0", the logical value "1", the logical value "1", and the logical value "0" for each cycle of the 7th cycle, 6th cycle, 5th cycle, 4th cycle, 3rd cycle, 2nd cycle, and 1st cycle to the input terminal ε of the second circuit device 6 electrically connected to the wiring 70 and the wiring 70. For example, the level shifter 5 receives the first signal that is a voltage level of the first power supply voltage VDDL, and outputs the second signal that is a voltage level of the second power supply voltage VDDH.

The input terminal ε of the delay circuit 68 receives the second signal, that is obtained by level-shifting the first calculation result including the logical value "1", the logical value "1", the logical value "1", the logical value "0", the logical value "1", the logical value "1", and the logical value "0", for each cycle of the 7th cycle, 6th cycle, 5th cycle, 4th cycle, 3rd cycle, 2nd cycle, and 1st cycle. The delay circuit 68 captures the logical value of the second signal, and outputs a sixth signal including the logical value of the second signal delayed from the second signal to the output terminal ζ. At this time, the delay circuit 68 outputs, for example, the sixth signal which is delayed by one cycle from the second signal (one clock cycle) to the output terminal ζ.

The input terminal α of the second XOR circuit 74 receives the second signal from the level shifter 5. The input terminal β of the second XOR circuit 74 receives the sixth signal from the output terminal ζ of the second DFF circuit 72. As a result, the second XOR circuit 74 generates the second calculation result including the logical value "0", the logical value "0", the logical value "1", the logical value "1", the logical value "0", the logical value "1", and the logical value "0" for each cycle of the 7th cycle, 6th cycle, 5th cycle, 4th cycle, 3rd cycle, 2nd cycle, and 1st cycle, and outputs the third calculation result including the second calculation result to the output terminal γ. The output terminal γ is electrically connected to the non-volatile memory BLK (BLK1 to BLKp), and the non-volatile memory BLK (BLK1 to BLKp) is supplied with the third signal including the second calculation result.

In the semiconductor memory device 100 according to the second embodiment, since the delay circuit 68 is used for the second circuit device 6, it is not necessary to use a signal which is a trigger such as a clock. Therefore, in the semiconductor memory device 100 according to the second embodiment, by using the delay circuit 68 for the second circuit device 6, it is possible to simplify the circuit configuration. Even when the semiconductor memory device 100 according to the second embodiment is used, the same operation and effects as those obtained when the first embodiment is used can be obtained.

The second circuit device 6 includes the delay circuit 68 and the second XOR circuit 74 electrically connected to the delay circuit 68. The delay circuit 68 receives the second signal including the logical value and outputs the sixth signal including the logic value (a value of the sixth signal) delayed from the input second signal. The second XOR circuit 74 receives the sixth signal and the second signal. At the timing where the sixth signal is input to the second XOR circuit 74, the second signal input to the second XOR circuit 74 includes the logic value (the third value). The second XOR circuit 74 generates the second calculation result using the logical value (the value of the sixth signal) and the logical value (the third value), and outputs the third signal including the second calculation result.

When the logical value (the value of the sixth signal) is different from the logic value (the third value), the second XOR circuit 74 generates the second calculation result having the voltage level of the second power supply voltage VDDH, and outputs the third signal including the second calculation result having the voltage level of the second power supply voltage VDDH. When the logical value (the value of the sixth signal) is the same as the logical value (the third value), the second XOR circuit 74 generates the second calculation result having the level of the voltage lower than the level of the voltage of the second power supply voltage VDDH, and outputs the third signal including the second calculation result having the level of the voltage lower than the level of the voltage of the second power supply voltage VDDH.

3. Third Embodiment

Figure 11:
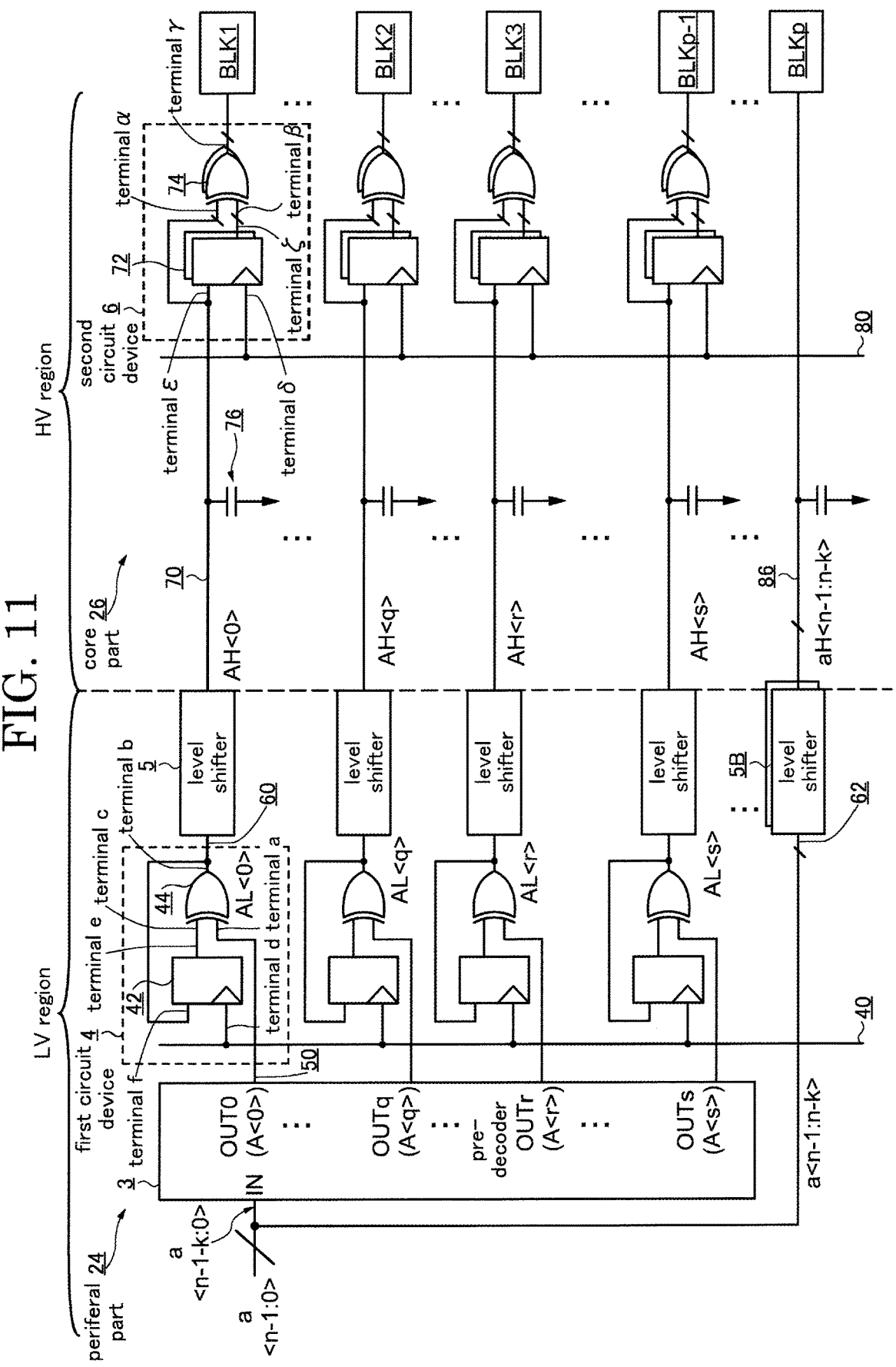
FIG. 11 is a block diagram showing a configuration from a pre-decoder to a second circuit device according to the third embodiment.

FIG. 11 is a block diagram showing a configuration from the pre-decoder 3 to the second circuit device 6 according to the third embodiment. In the semiconductor memory device according to the third embodiment, not all of the plurality of address signals but a part of a plurality of address signals (a first signal part) is made into the one-hot signal. This point is different from the semiconductor memory device according to the first and second embodiments. Since the other configurations are the same as those of the first embodiment or the second embodiment, the description thereof is omitted here. The configuration from the pre-decoder 3 to the second circuit device 6 according to the third embodiment is not limited to the configuration shown in FIG. 11. Descriptions of the same or similar components as those of FIGS. 1 to 10 may be omitted.

As shown in FIG. 11, the semiconductor memory device according to the third embodiment receives the n-bit address signal a<n−1:0> from the control circuit 2. Among the input n-bit address signal a<n−1:0>, the pre-decoder 3 receives n−k bit address signal a<n−1−k:0> as the first signal part. Since the configuration and operation method of the pre-decoder 3 to the non-volatile memory BLK (BLK1 to BLKp−1) are the same as those of the first embodiment, descriptions thereof will be omitted. The value k is a positive natural number that is 0<k<n.

A plurality of level shifters 5B receives the remining k-bit address signal a<n−1:n−k> as the second signal part. The level shifter 5B receives the k-bit address signal a<n−1:n−k> and generates a level-shifted k-bit address signal aH<n−1: n−k>. Further, the plurality of level shifters 5B supplies the level-shifted k-bit address signal aH<n−1:n−k> to a wiring 86 and the non-volatile memory BLK (e.g., BLKp) electrically connected to the wiring 86. The wiring 86 is a bus line supplied with the k-bit address signal aH<n−1:n−k>. In this embodiment, the wiring 86 is sometimes referred to as the second wiring.

The wiring 86 is electrically connected to the column decoder 14 and the row decoder 16 included in the non-volatile memory BLK. Therefore, the level-shifted k-bit address signal aH<n−1-k:k> is output to the column decoder 14 and the row decoder 16.

For example, when it is assumed that the numerical value n is 30 and the numerical value k is 4, 26-bits of the 30-bits address signal are input to the pre-decoder 3, and 4-bits address signal is input to the level shifter 5B.

The 26-bits address signal becomes the one-hot signal using the pre-decoder 3 and is transferred to the non-volatile memory BLK. The remaining 4-bits address signal is transferred to the non-volatile memory BLK without using the pre-decoder 3. As shown in FIG. 7, for example, when the data bit width is 4-bits, the expected value of data transition of the "one-hot signal (the RZ one-hot signal)" is equivalent to the expected value of data transition of "without encoding (the n-bit random data transfer)".

The semiconductor memory device according to the third embodiment can transfer the address signal having a large number of bits by the one-hot signal and can transfer the address signal having a small number of bits without converting it into the one-hot signal. In a small-capacity non-volatile memory BLK, the wiring is less routed, and the transfer energy of the address signal is relatively low. In the semiconductor memory device according to the third embodiment, it is possible to perform the one-hot-signal transfer for the large-capacity non-volatile memory BLK and data transfer for the small-capacity non-volatile memory BLK. As a result, by using the semiconductor memory device according to the third embodiment, it is possible to apply the address transfer suitable for each of a large-capacity non-volatile memory BLK and the small-capacity non-volatile memory BLK. Even when the semiconductor memory device 100 according to the third embodiment is used, the same operation and effects as those obtained when the first embodiment is used can be obtained.

The semiconductor memory device 100 includes the peripheral part 24 (the peripheral circuit part), the core part 26 (the core circuit part), the pre-decoder 3, the wiring 50 (the first wiring), the wiring 70 (the second wiring), the first level shifter, the second level shifter, the first memory cell array, and the second memory cell array. The peripheral part 24 is supplied with the first power supply voltage VDDL (the first voltage). The core part 26 is supplied with the second power supply voltage VDDH (the second voltage) greater than the first power supply voltage VDDL. The pre-decoder 3 is provided in the peripheral part 24, receives the part of the plurality of address signals, and outputs the pre-decode signal (the one-hot signal) that one of a part of the plurality of address signals changes. The wiring 50 is provided in the peripheral part 24, electrically connected to the pre-decoder 3, and supplied with the one-hot signal. The wiring 70 is provided in the core part 26. The first level shifter is provided in the peripheral part 24, supplied with the first power supply voltage VDDL and the second power supply voltage VDDH, and transfers the one-hot signal from the wiring 50 to the wiring 70. The second level shifter is provided in the peripheral part 24, supplied with the first power supply voltage VDDL and the second power supply voltage VDDH, make the voltage level of the address signal other than the part of the plurality of address signals shifts from the voltage level of the first power supply voltage VDDL to the voltage level of the second power supply voltage VDDH, and generates a level shift signal of the address signal other than the part of the plurality of address signals. The first memory cell array is provided in the core part 26 and operates based on the transferred one-hot signal. The second memory cell array is provided in the core part 26 and operates based on the level shift signal of the address signal other than the part of the plurality of address signals.

Although the configuration and the driving method of some embodiments of the present disclosure have been described above with reference to the drawings, the configuration and the driving method of the present disclosure are not limited to the above-described embodiments and can be modified as appropriate without departing from the spirit of the present disclosure. For example, the one deletes, or changes the design of components as appropriate by a person skilled in the art based on the present embodiment is also included in the scope of the present disclosure as long as the gist of the present disclosure is provided. Furthermore, the embodiments described above can be appropriately combined as long as there is no mutual inconsistency, and technical matters common to the embodiments are included in the embodiments even if they are not explicitly described.

Even if it is another operation and effects which are different from the operation and effects brought about by the mode of each above-mentioned embodiment, what is clear from the description in this Description, or what can be easily predicted by the person skilled in the art is naturally understood to be brought about by the present invention.

What is claimed is:

1. A semiconductor memory device comprising:
    a peripheral circuit part supplied with a first voltage;
    a core circuit part supplied with a second voltage greater than the first voltage;
    a pre-decoder provided in the peripheral circuit part, input with a signal and outputting a one-hot signal corresponding to the signal;
    a first wiring provided in the peripheral circuit part, electrically connected to the pre-decoder, and supplied with the one-hot signal;
    a second wiring provided in the core circuit part;
    a level shifter supplied with the first voltage and the second voltage, and transferring the one-hot signal from the first wiring in the peripheral circuit part to the second wiring in the core circuit part; and
    a memory cell array provided in the core circuit part and operating based on the transferred one-hot signal.

2. The semiconductor memory device according to claim 1, further comprising,
    a first circuit device provided in the peripheral circuit part, electrically connected between the first wiring and the level shifter, and operating by the first voltage; and
    a second circuit device provided in the core circuit part, electrically connected between the level shifter and the memory cell array, and operating by the second voltage;
    wherein the first circuit device receives the one-hot signal and outputs a first signal including a first calculation result,
    the level shifter receives the first signal and outputs a second signal,
    the second circuit device receives the second signal and outputs a third signal including a second calculation result,
    the second calculation result includes the transferred one-hot signal, and
    the memory cell array operates based on the third signal.

3. The semiconductor memory device according to claim 2, wherein
    the first circuit device includes a first DFF and a first XOR circuit electrically connected to the first DFF,
    the first DFF receives the first signal including the first calculation result and outputs a fourth signal, and
    the first XOR circuit receives the one-hot signal and the fourth signal, generates the first calculation result and outputs the first signal including the first calculation result.

4. The semiconductor memory device according to claim 3, wherein
    when a value of the one-hot signal is different from a value of the fourth signal, the first XOR circuit generates the first calculation result of a first voltage level and outputs the first signal including the first calculation result of the first voltage level, and
    when the value of the one-hot signal is the same as the value of the fourth signal, the first XOR circuit generates the first calculation result of a voltage level lower than the first voltage level and outputs the first signal including the first calculation result of the voltage level lower than the first voltage level.

5. The semiconductor memory device according to claim 2, wherein
    the second circuit device includes a second DFF and a second XOR circuit electrically connected to the second DFF,
    wherein
    the second DFF receives the second signal, stores a value of the second signal, and outputs a fifth signal and
    the second XOR circuit receives the fifth signal and the second signal, generates the second calculation result, and outputs the third signal including the second calculation result.

6. The semiconductor memory device according to claim 5, wherein
when a value of the second signal is different from a value of the fifth signal, the second XOR circuit generates the second calculation result of a second voltage level and outputs the third signal including the second calculation result of the second voltage level, and
when the value of the second signal is the same as the value of the fifth signal, the second XOR circuit generates the second calculation result of a voltage level lower than the second voltage level and outputs the third signal including the second calculation result of the voltage level lower than the second voltage level.

7. The semiconductor memory device according to claim 2, wherein
the second circuit device includes a delay circuit and a second XOR circuit electrically connected to the delay circuit,
the delay circuit receives the second signal and outputs a sixth signal delayed from the input second signal,
the second XOR circuit receives the second signal and the sixth signal, generates the second calculation result using a value of the second signal and a value of the sixth signal, and outputs the third signal including the second calculation result.

8. The semiconductor memory device according to claim 7, wherein
when the value of the second signal is different from the value of the sixth signal, the second XOR circuit generates the second calculation result of a second voltage level and outputs the third signal including the second calculation result of the second voltage level, and
when the value of the second signal is the same as the value of the sixth signal, the second XOR circuit generates the second calculation result of a voltage level lower than the second voltage level and outputs the third signal including the second calculation result of the voltage level lower than the second voltage level.

9. The semiconductor memory device according to claim 1, wherein the one-hot signal is an NRZ one-hot signal.

10. A method for driving a semiconductor memory device including a peripheral circuit part supplied with a first voltage, a core circuit part supplied with a second voltage greater than the first voltage, a pre-decoder provided in the peripheral circuit part, a first wiring provided in the peripheral circuit part and electrically connected to the pre-decoder, a second wiring provided in the core circuit part, a level shifter supplied with the first voltage and the second voltage, and a memory cell array provided in the core circuit part comprising:
inputting a signal to the pre-decoder and outputting a one-hot signal corresponding to the signal from the pre-decoder;
supplying the one-hot signal to the level shifter and transferring the one-hot signal from the first wiring in the peripheral circuit part to the second wiring in the core circuit part;
supplying the memory cell array with a signal based on the transferred one-hot signal, and
operating the memory cell array.

11. The method for driving a semiconductor memory device according to claim 10, wherein,
the semiconductor memory device includes a first circuit device provided in the peripheral circuit part, electrically connected between the first wiring and the level shifter and operating by the first voltage, and a second circuit device provided in the core circuit part, electrically connected between the level shifter and the memory cell array, and operating by the second voltage;
the one-hot signal is input to the first circuit device, and a first signal including a first calculation result is output from the first circuit device;
the first signal is input to the level shifter and a second signal is output from the level shifter;
the second signal is input to the second circuit device and a third signal including a second calculation result which is the transferred one-hot signal is output from the second circuit device; and
the memory cell array is operated based on the third signal.

12. The method for driving a semiconductor memory device according to claim 11, wherein
the first circuit device includes a first DFF and a first XOR circuit electrically connected to the first DFF;
the first signal including the first calculation result is input to the first DFF and a fourth signal is output from the first DFF; and
the one-hot signal and the fourth signal are input to the first XOR circuit,
the first calculation result is generated using a value of the one-hot signal and a value of the fourth signal, and the first signal including the first calculation result is output from the first XOR circuit.

13. The method for driving a semiconductor memory device according to claim 12,
wherein
when the value of the one-hot signal is different from the value of the fourth signal, the first XOR circuit generates the first calculation result of the first voltage level and outputs the first signal including the first calculation result of the first voltage level, and
when the value of the one-hot signal is the same as the value of the fourth signal, the first XOR circuit generates the first calculation result of a voltage level lower than the first voltage level and outputs the first signal including the first calculation result of the voltage level lower than the first voltage level.

14. The method for driving a semiconductor memory device according to claim 11, wherein
the second circuit device includes a second DFF and a second XOR circuit electrically connected to the second DFF,
wherein
the second DFF receives the second signal, stores a value of the second signal, and outputs a fifth signal and
the second XOR circuit receives the fifth signal and the second signal, generates the second calculation result, and outputs the third signal including the second calculation result.

15. The method for driving a semiconductor memory device according to claim 14,
wherein
when a value of the second signal is different from a value of the fifth signal, the second XOR circuit generates the second calculation result of the second voltage level and outputs the third signal including the second calculation result of the second voltage level, and when the value of the second signal is the same as the value of the fifth signal, the second XOR circuit generates the second calculation result of a voltage level lower than the second voltage level and outputs the third signal including the second calculation result of the voltage level lower than the second voltage level.

16. The method for driving a semiconductor memory device according to claim 11, wherein the second circuit device includes a delay circuit and a second XOR circuit electrically connected to the delay circuit, the delay circuit receives the second signal and outputs a sixth signal delayed from the input second signal, the second XOR circuit receives the second signal and the sixth signal, generates the second calculation result using a value of the second signal and a value of the sixth signal, and outputs the third signal including the second calculation result.

17. The method for driving a semiconductor memory device according to claim 16, wherein when the value of the second signal is different from the value of the sixth signal, the second XOR circuit generates the second calculation result of a second voltage level and outputs the third signal including the second calculation result of the second voltage level, and when the value of the second signal is the same as the value of the sixth signal, the second XOR circuit generates the second calculation result of a voltage level lower than the second voltage level and outputs the third signal including the second calculation result of the voltage level lower than the second voltage level.

18. The method for driving a semiconductor memory device according to claim 10, wherein the one-hot signal is an NRZ one-hot signal.

19. A semiconductor memory device, comprising:

a peripheral circuit part supplied with a first voltage;

a core circuit part supplied with a second voltage greater than the first voltage;

a pre-decoder provided in the peripheral circuit part, input with a first signal part of a signal including the first signal part and a second signal part, and outputting a one-hot signal corresponding to the first signal part;

a first wiring provided in the peripheral circuit part, electrically connected to the pre-decoder, and supplied with the one-hot signal;

a second wiring provided in the core circuit part;

a first level shifter supplied with the first voltage and the second voltage and transferring the one-hot signal from the first wiring in the peripheral circuit part to the second wiring in the core circuit part;

a second level shifter supplied with the first voltage and the second voltage, shifting a level of a voltage of the second signal part from a level of the first voltage to a level of the second voltage, and generating a level shift signal of the second signal part;

a first memory cell array provided in the core circuit part and operating based on the transferred one-hot signal; and a second memory cell array provided in the core circuit part and operating based on the level shift signal of the second signal part.

* * * * *